US009211946B2

(12) United States Patent
Good et al.

(10) Patent No.: US 9,211,946 B2
(45) Date of Patent: Dec. 15, 2015

(54) WING FOLD SYSTEM WITH LATCH PINS THROUGH MULTIPLE MATING LUGS

(71) Applicant: The Boeing Company, Chicago, IL (US)

(72) Inventors: Mark Steven Good, Seattle, WA (US); Jan A. Kordel, Redmond, WA (US); Quentin Theodor Pietersen, Kirkland, WA (US); Steven Paul Walker, Arlington, WA (US); Kelly Thomas Jones, Snohomish, WA (US); Matthew August Lassen, Seattle, WA (US); Rickie Hansken, Tulalip, WA (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

(21) Appl. No.: 14/049,425

(22) Filed: Oct. 9, 2013

(65) Prior Publication Data
US 2014/0061371 A1 Mar. 6, 2014

Related U.S. Application Data

(63) Continuation-in-part of application No. 13/664,416, filed on Oct. 30, 2012, which is a continuation-in-part of application No. 13/251,216, filed on Oct. 1, 2011.

(60) Provisional application No. 61/720,345, filed on Oct. 30, 2012.

(51) Int. Cl.
*B64C 3/56* (2006.01)
*B64C 3/54* (2006.01)

(52) U.S. Cl.
CPC . *B64C 3/56* (2013.01); *Y02T 50/145* (2013.01)

(58) Field of Classification Search
CPC .......... B64C 3/56; B64C 23/065; B64C 5/12; B64C 5/08
USPC ............... 244/49, 218, 39, 199.4, 124, 123.1, 244/123.8
See application file for complete search history.

(56) References Cited

U.S. PATENT DOCUMENTS

| 1,718,617 A | 6/1929 | Wagner |
| 1,723,962 A | 8/1929 | Weymouth |

(Continued)

FOREIGN PATENT DOCUMENTS

| EP | 1375342 A1 | 1/2004 |
| EP | 0988225 B1 | 10/2006 |

(Continued)

OTHER PUBLICATIONS

Office Action, dated May 9, 2015, regarding U.S. Appl. No. 13/962,952, 24 pages.

(Continued)

Primary Examiner — Rob Swiatek
Assistant Examiner — Marc Burgess
(74) Attorney, Agent, or Firm — Yee & Associates, P.C.

(57) ABSTRACT

A wing fold system of a wing of an aircraft. The system may include a first lock of a latch to prevent movement of a latch pin of the latch to prevent movement of an unfixed portion of the wing with respect to a fixed portion of the wing, the first lock may include a first cam configured to prevent the second lock from transitioning to a second engaged position until the first lock may be in a first engaged position via contact with a second cam of the second lock. A second lock of the latch, the second lock may include the second cam configured to prevent the first lock from transitioning away from the first engaged position until the second lock transitions away from the second engaged position.

17 Claims, 19 Drawing Sheets

(56) References Cited

U.S. PATENT DOCUMENTS

| | | | |
|---|---|---|---|
| 2,021,324 A | | 11/1935 | Osborn |
| 2,166,564 A | | 7/1939 | Atwood et al. |
| 2,280,809 A | * | 4/1942 | Evans .......................... 244/49 |
| 2,289,224 A | | 7/1942 | Swanson et al. |
| 2,290,850 A | * | 7/1942 | Umschweif .................. 244/49 |
| 2,392,506 A | | 1/1946 | Rossmann |
| 2,444,332 A | | 6/1948 | Briggs et al. |
| 2,468,425 A | | 4/1949 | Carpenter et al. |
| 2,533,429 A | | 12/1950 | Carpenter |
| 2,674,422 A | | 4/1954 | Pellarini |
| 2,712,421 A | * | 7/1955 | Naumann ..................... 244/49 |
| 2,719,682 A | | 10/1955 | Handel |
| 2,876,677 A | | 3/1959 | Clark et al. |
| 3,556,439 A | | 1/1971 | Autry et al. |
| 4,249,765 A | | 2/1981 | Janssen |
| 4,457,479 A | | 7/1984 | Daude |
| 4,824,053 A | | 4/1989 | Sarh |
| 5,201,479 A | | 4/1993 | Renzelmann |
| 5,310,138 A | | 5/1994 | Fitzgibbon |
| 5,350,135 A | | 9/1994 | Renzelmann et al. |
| 5,372,336 A | | 12/1994 | Peaz |
| 5,379,969 A | | 1/1995 | Marx et al. |
| 5,381,986 A | | 1/1995 | Smith et al. |
| 5,427,329 A | | 6/1995 | Renzelmann et al. |
| 5,452,643 A | | 9/1995 | Smith et al. |
| 5,495,999 A | | 3/1996 | Cymara |
| 5,558,299 A | | 9/1996 | Veile |
| 5,988,563 A | | 11/1999 | Allen |
| 6,032,418 A | * | 3/2000 | Larson ......................... 49/333 |
| 6,076,766 A | | 6/2000 | Gruensfelder |
| 6,089,502 A | | 7/2000 | Herrick et al. |
| 6,168,113 B1 | | 1/2001 | Hann et al. |
| 6,260,799 B1 | | 7/2001 | Russ |
| 6,834,835 B1 | | 12/2004 | Knowles et al. |
| 7,275,722 B2 | | 10/2007 | Irving et al. |
| 7,445,180 B2 | | 11/2008 | Plude et al. |
| 7,637,454 B2 | | 12/2009 | Pitt |
| 7,744,038 B2 | | 6/2010 | Sankrithi et al. |
| 8,157,206 B2 | | 4/2012 | Gionta et al. |
| 8,342,447 B2 | | 1/2013 | Etling |
| 2009/0045288 A1 | | 2/2009 | Nakamura et al. |
| 2009/0302151 A1 | | 12/2009 | Holmes |
| 2010/0084516 A1 | | 4/2010 | Eberhardt |
| 2011/0001016 A1 | | 1/2011 | Skillen et al. |
| 2011/0180657 A1 | * | 7/2011 | Gionta et al. .................. 244/49 |
| 2012/0032023 A1 | | 2/2012 | Bousfield et al. |
| 2012/0085858 A1 | | 4/2012 | Seifert |
| 2012/0228424 A1 | | 9/2012 | Parker |
| 2013/0099060 A1 | | 4/2013 | Dees et al. |
| 2013/0292508 A1 | * | 11/2013 | Fox ................................ 244/49 |
| 2015/0014478 A1 | | 1/2015 | Lassen et al. |

FOREIGN PATENT DOCUMENTS

| | | |
|---|---|---|
| EP | 2650212 A1 | 10/2010 |
| GB | 481050 A | 3/1938 |
| GB | 773739 A | 7/1955 |

OTHER PUBLICATIONS

Dong, "Adaptive Wing for an Aircraft," U.S. Appl. No. 13/871,296, filed Apr. 26, 2013, 27 pages.

Fox, "Fold Wing Tip Having Stub Spar," U.S. Appl. No. 13/251,216, filed Oct. 1, 2011, 16 pages.

Good et al., "Wing Hinge Assembly Including Hinged Torque Boxes," U.S. Appl. No. 13/664,371, filed Oct. 30, 2012, 20 pages.

Kordel et al., "Latching Apparatus and Methods," U.S. Appl. No. 13/493,688, filed Jun. 11, 2012, 38 pages.

Young et al., "Aircraft Excrescence Drag," North Atlantic Treaty Organization Advisory Group for Aerospace Research and Development AGARD-AG-264, Jul. 1981, 172 pages.

"Folding wing," Wikipedia Foundation, Inc., dated Jun. 2, 2013, 5 pages. Accessed Jul. 29, 2013, http://en.wikipedia.org/wiki/Folding_wing.

Fox et al., "Wing Fold System," U.S. Appl. No. 13/962,952, filed Aug. 9, 2013, 48 pages.

Santini et al., "Horizontal Folding wingtip," U.S. Appl. No. 13/964,072, filed Aug. 10, 2013, 63 pages.

Fox et al., "Wing Fold System Rotating Latch," U.S. Appl. No. 13/966,754, filed Aug. 14, 2013, 90 pages.

Lassen et al., "Wing Fold Controller," U.S. Appl. No. 14/022,622, filed Sep. 10, 2013, 61 pages.

Extended European Search Report, dated Jul. 21, 2015, regarding Application No. EP13190093.8, 6 pages.

Extended European Search Report, dated Jul. 24, 2015, regarding Application No. EP13189910.6, 6 pages.

Extended European Search Report, dated Jul. 24, 2015, regarding Application No. EP13190099.5, 5 pages.

Extended European Search Report, dated Jul. 27, 2015, regarding Application No. EP13189962.7, 7 pages.

Canadian Intellectual Property Office Examination Search Report, dated Aug. 3, 2015, regarding Application No. 2,825,073, 4 pages.

Canadian Intellectual Property Office Examination Search Report, dated Aug. 13, 2015, regarding Application No. 2,824,727, 4 pages.

Final Office Action, dated Aug. 21, 2015, regarding U.S. Appl. No. 13/962,952 , 12 pages.

Office Action, dated Jul. 20, 2015, regarding U.S. Appl. No. 14/022,622, 23 pages.

Notice of Allowance, dated Jul. 24, 2015, regarding U.S. Appl. No. 13/964,072, 17 pages.

Office Action, dated Sep. 23, 2015, regarding U.S. Appl. No. 13/966,754, 25 pages.

* cited by examiner

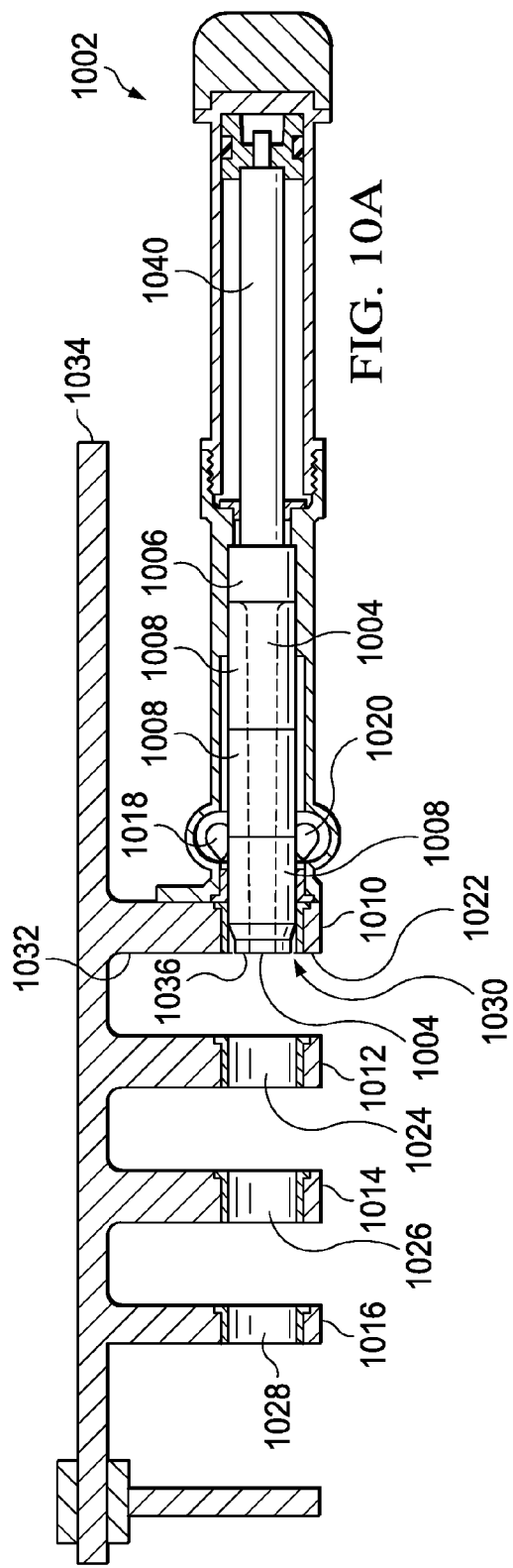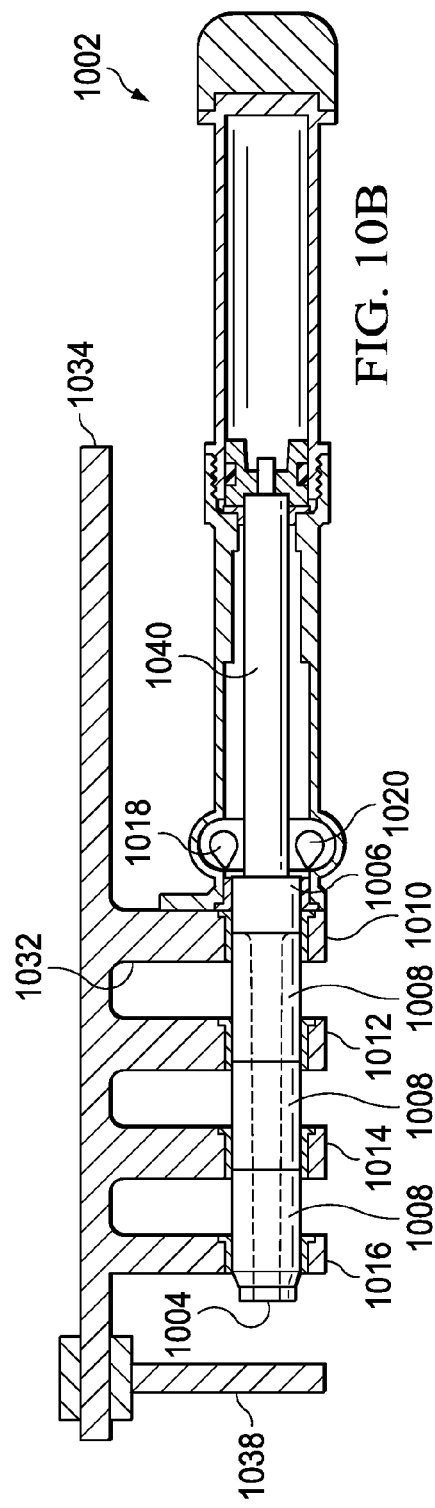
FIG. 10A
FIG. 10B

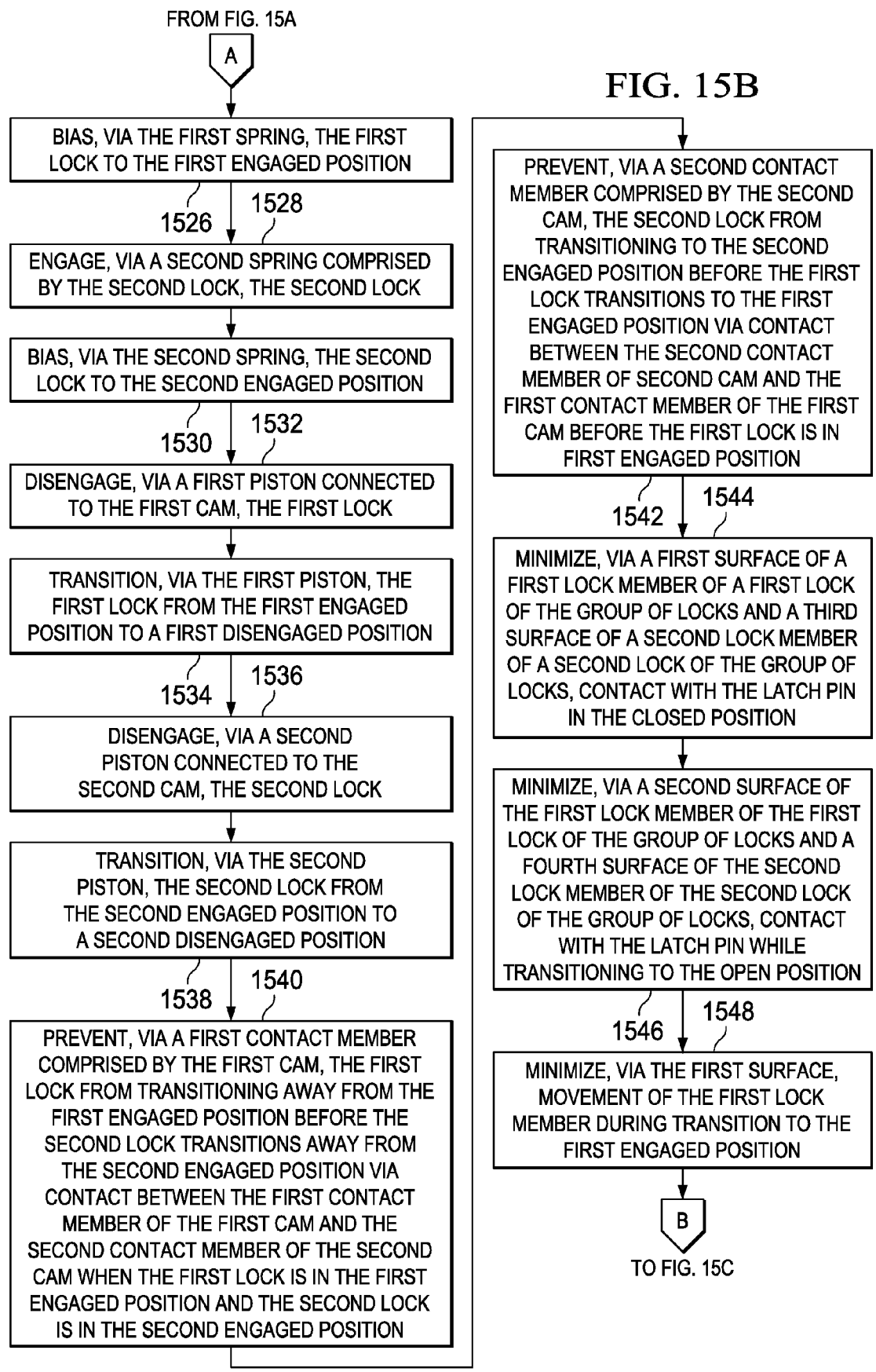

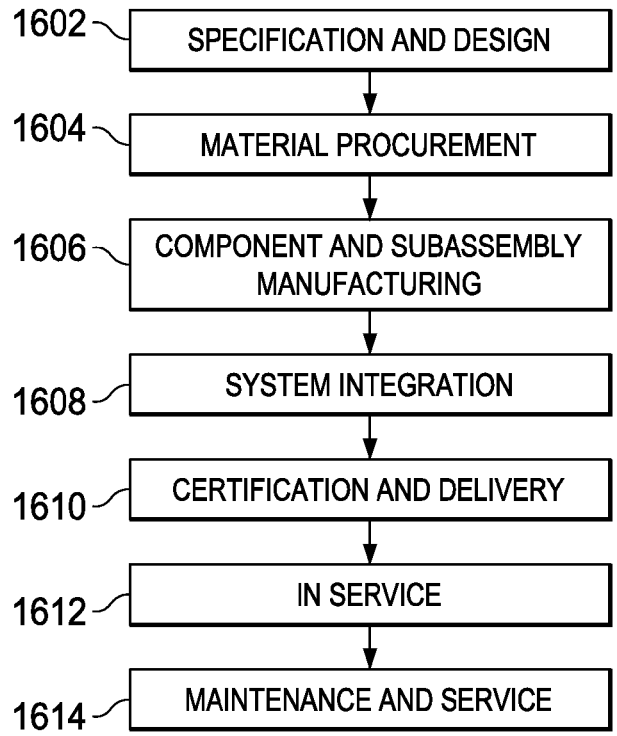
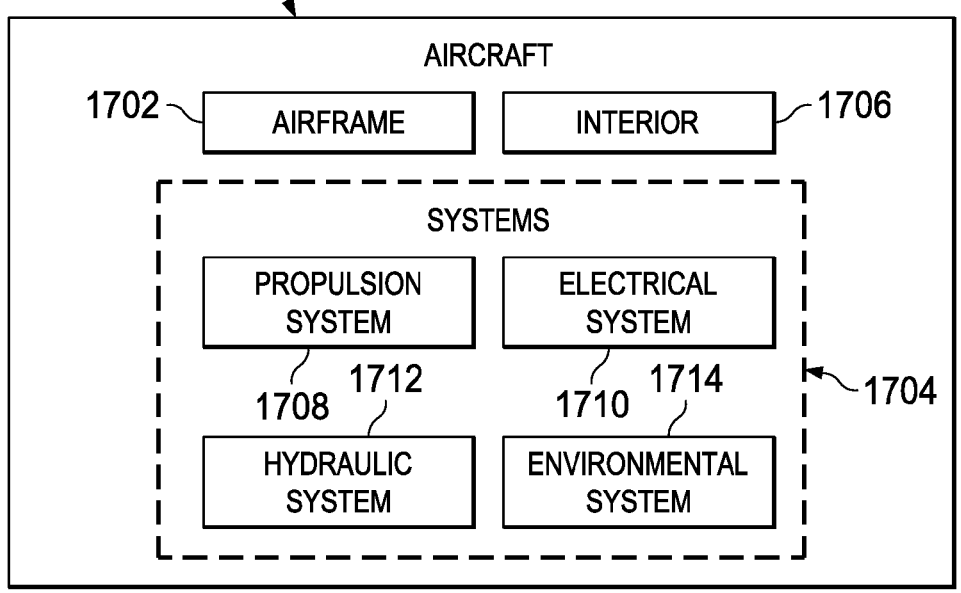

WING FOLD SYSTEM WITH LATCH PINS THROUGH MULTIPLE MATING LUGS

CROSS REFERENCE AND PRIORITY

The instant application claims priority to Provisional U.S. Patent Application No. 61/720,345, filed Oct. 30, 2012; the instant application is a continuation-in-part of U.S. patent application Ser. No. 13/664,416, filed Oct. 30, 2012, which is a continuation-in-part of U.S. patent application Ser. No. 13/251,216, filed on Oct. 1, 2011; disclosures of each of the above noted applications are incorporated herein by reference in their entirety.

FIELD OF THE DISCLOSURE

This disclosure relates to systems and methods for providing wings, and more specifically, to systems and methods for latching wings that enhance aircraft performance.

BACKGROUND OF THE DISCLOSURE

In today's commercial transport industry, it is highly desirable to design aircraft configurations that yield reduced fuel burn per seat-mile, as fuel burn per seat-mile is a metric of fuel efficiency. Efficient aircraft configurations are ever more important as fuel costs increase. Aircraft aerodynamic drag and fuel burn are generally reduced as the aspect ratio of the aircraft wing increases. Similarly, operating larger aircraft, carrying more passengers and payload, are generally more efficient between two destinations than flying several trips with smaller aircraft. Thus larger aircraft and aircraft with longer wingspans tend to be more efficient. However, taxiway spacing and gate locations for most airports were established without providing adequate spacing for aircraft with the longer wingspans that can be produced with today's technology.

Thus it is advantageous to provide an aircraft that can benefit from a long wingspan in flight, while being able to reduce the wingspan while operating at an airport.

SUMMARY

Illustrative embodiments provide for a method of a wing fold system of a wing of an aircraft is presented. The method may include preventing, via a first cam that may include a first lock of a latch, which may prevent movement of a latch pin of the latch, which may prevent movement of an unfixed portion of the wing with respect to a fixed portion of the wing, a second lock from transitioning to a second engaged position until the first lock is in a first engaged position via contact with a second cam of the second lock. Preventing, via the second cam comprised by the second lock of a latch, the first lock from transitioning away from the first engaged position until the second lock transitions away from the second engaged position.

Illustrative embodiments provide for a wing fold system of a wing of an aircraft. The system may include a first lock of a latch to prevent movement of a latch pin of the latch to prevent movement of an unfixed portion of the wing with respect to a fixed portion of the wing, the first lock comprising a first cam to prevent the second lock from transitioning to a second engaged position until the first lock is in a first engaged position via contact with a second cam of the second lock. A second lock of the latch, the second lock comprising second cam to prevent the first lock from transitioning away from the first engaged position until the second lock transitions away from the second engaged position.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7A is a diagram of a location of a wing fold system in a wing, FIG. 7B is a perspective top view diagram of selected elements of a wing fold system with the wing in a flight position in accordance with an illustrative embodiment;

FIGS. 10A and 10B are a top view cutaway diagram of a latch pin from a latch of a wing fold system in accordance with an illustrative embodiment, FIG. 10A illustrates the latch pin with the latch in an open position, and FIG. 10B illustrates the latch pin with the latch in a closed position;

FIG. 11A is a side view diagram with a first central axis of the first latch pin and a second central axis of the second latch pin each being aligned substantially parallel to a centerline of rotation of an unfixed portion of the wing. FIG. 11B is a side view diagram with each central axis canted away from the centerline of rotation of the unfixed portion of the wing.

FIG. 13A depicts the latch in closed position, with the first lock member and the second lock member engaged with latch pin, FIG. 13B depicts the second locked member disengaging from the latch pin as first lock member remains engage with the latch pin, FIG. 13C depicts the second locked member further disengaging from the latch pin as first lock member disengages from the latch pin; and FIG. 13D depicts both the first lock member and the second lock member fully disengaged from the latch pin before the latch pin moves from closed position;

FIGS. 15A-15C is a diagram of operations for a method of a wing fold system in accordance with an illustrative embodiment; FIG. 15A shows operations 1502 to 1524 of the method; FIG. 15B shows operations 1526 to 1548 of the method; and FIG. 15C shows operations 1550 to 1572 of the method.

FIG. 16 is an illustration of an aircraft manufacturing and service method is depicted in accordance with an illustrative embodiment; and FIG. 17 is an illustration of an aircraft is depicted in which an illustrative embodiment may be implemented.

DETAILED DESCRIPTION

Figure 1:
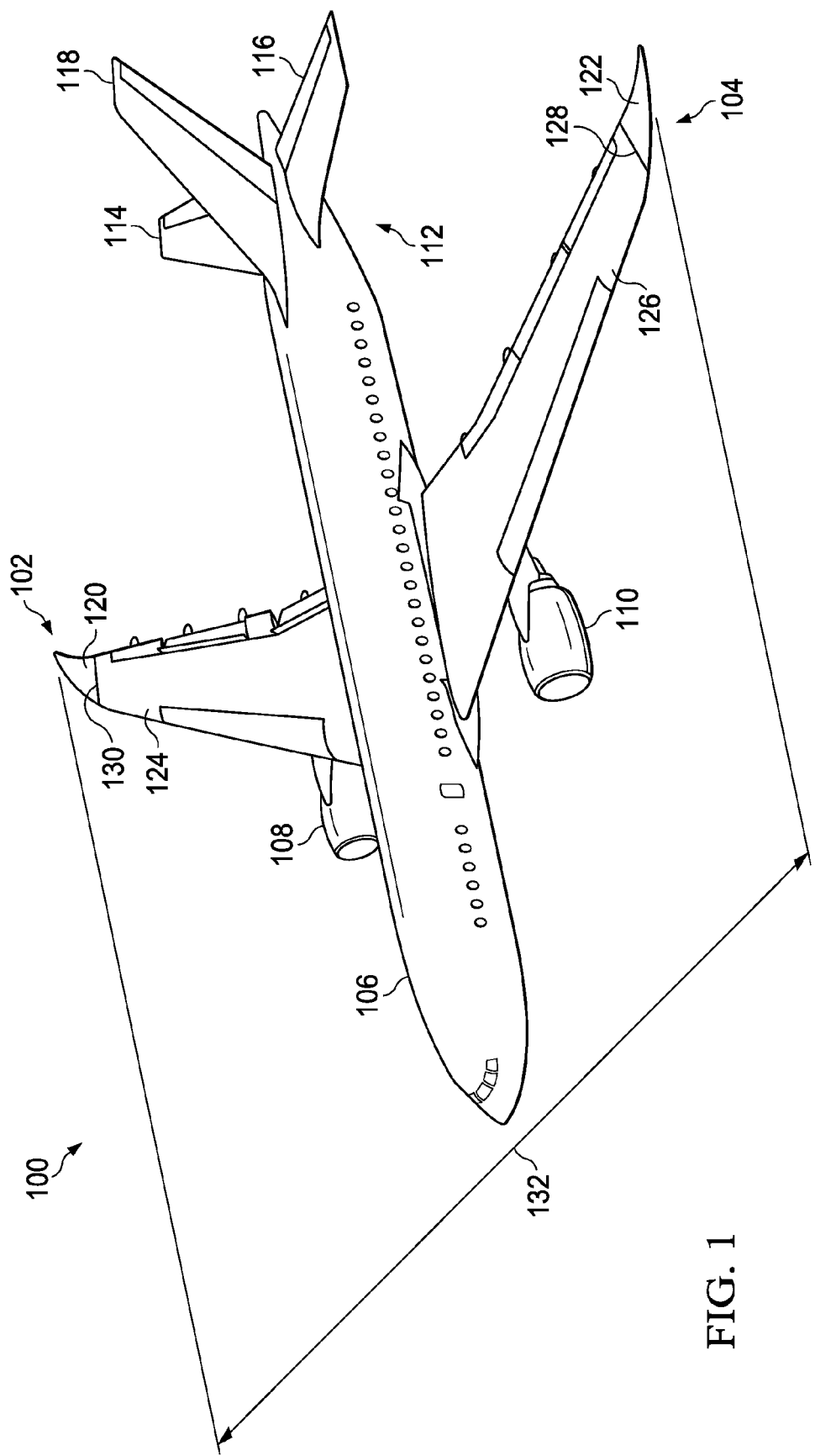
FIG. 1 is a diagram of an aircraft embodying a wing fold controller of a wing fold system in a flight position in accordance with an illustrative embodiment.
Figure 2:
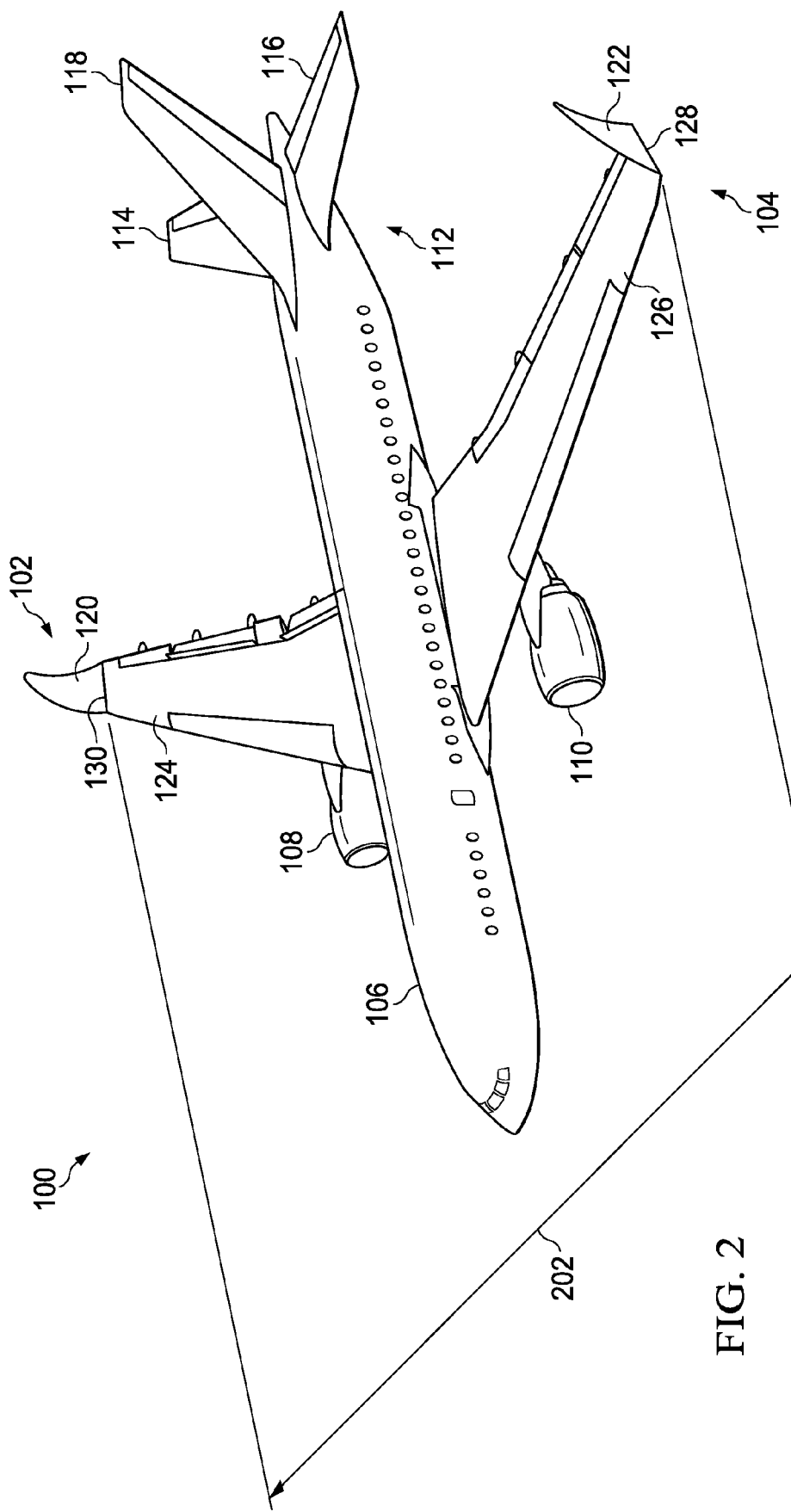
FIG. 2 is a diagram of an aircraft embodying a wing fold controller of a wing fold system in a folded position in accordance with an illustrative embodiment.

Unless otherwise noted and where appropriate, similarly named features and elements of an embodiment of one figure of the disclosure correspond to and embody similarly named features and elements of embodiments of the other figures of the disclosure. With reference now to the figures, and in particular, with reference to FIGS. 1 and 2, an illustration of a diagram of an aircraft embodying a wing fold controller of a wing fold system is depicted in accordance with an illustrative embodiment. In this illustrative example, aircraft 100 includes wing 102 and wing 104 attached to body 106; engine 108 attached to wing 102; engine 110 attached to wing 104. FIG. 1 depicts wing 102 and wing 104 of aircraft 100 in a flight position with wingspan 132. FIG. 2 depicts wing 102 and wing 104 of aircraft 100 in a folded position with wingspan 202. Wingspan 202 may be shorter than wingspan 132.

Wing 102 includes fixed portion 124 and unfixed portion 120. Fixed portion 124 may be an inboard portion of wing 102, which is fixed to body 106. Similarly, wing 104 includes fixed portion 126 and unfixed portion 122. Wing 102 includes wing fold system 130 to move unfixed portion 120 with respect to fixed portion 124. Wing 104 includes wing fold system 128 to move unfixed portion 122 with respect to fixed portion 126.

Body 106 has tail section 112. Horizontal stabilizer 114, horizontal stabilizer 116, and vertical stabilizer 118 are attached to tail section 112 of body 106.

Aircraft 100 is an example of an aircraft in which a wing fold system may be implemented in accordance with an illustrative embodiment. Wing fold system 128 and wing fold system 130 each may include a latch assembly in accordance with an illustrative embodiment.

Figure 3:
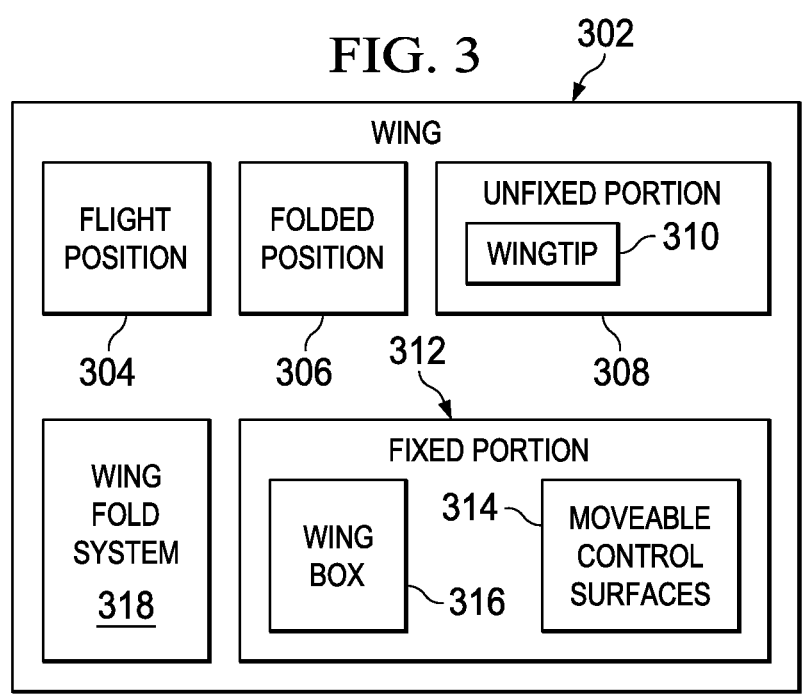
FIG. 3 is a block diagram of a wing of an aircraft with a wing fold system in accordance with an illustrative embodiment.

With reference to FIG. 3, FIG. 3 is a block diagram of a wing of an aircraft with a wing fold system in accordance with an illustrative embodiment. More specifically, wing 302 may be an illustrative embodiment of wing 102 and/or wing 104 in FIGS. 1 and 2. Wing 302 may include flight position 304, folded position 306, fixed portion 312, unfixed portion 308, and wing fold system 318. The folding of wing 302 may allow for an aircraft to be flown with a wingspan that is longer than that allowed by an airport, such as but not limited to International Civil Aviation Organization "Code E" airports, from which the aircraft may be used, and wing 302 may provide lift for the aircraft.

Flight position 304 may be a state of wing 302. When wing 302 of an aircraft is in flight position 304, the aircraft may be ready for flight. For example, wing 102 and wing 104 of FIG. 1 are in a flight position.

Folded position 306 may be a state of wing 302. When wing 302 of an aircraft is in folded position 306, the aircraft is not ready for flight, but the overall wingspan of aircraft 100 may be shorter. A shorter wingspan may allow use of aircraft 500 in locations at airports that require a shorter overall wingspan.

Fixed portion 312 may be an embodiment of fixed portion 124 of wing 102 and an embodiment of fixed portion 126 of wing 104 of FIGS. 1 and 2. Fixed portion 312 of wing 302 may include wing box 316 and moveable control surfaces 314. Wing box 316 may be a structural component connected to wing 302. Moveable control surfaces 314 may include flaps that allow for controlling flight of aircraft 100.

Unfixed portion 308 may be an embodiment of unfixed portion 120 of wing 102 and an embodiment of unfixed portion 122 of wing 104 of FIGS. 1 and 2. Unfixed portion 308 rotates with respect to fixed portion 312 of wing 302 between flight position 304 of wing 302 and folded position 306 of wing 302. Unfixed portion 308 of wing 302 may include wingtip 310. Wingtip 310 may not include moveable control surfaces 314.

Wing fold system 318 may be an embodiment of wing fold system 128 and wing fold system 130 of FIGS. 1 and 2. Wing fold system 318 may move wingtip 310 between flight position 304 and folded position 306. Wing fold system 318 may include several features and components as described below.

Figure 4:
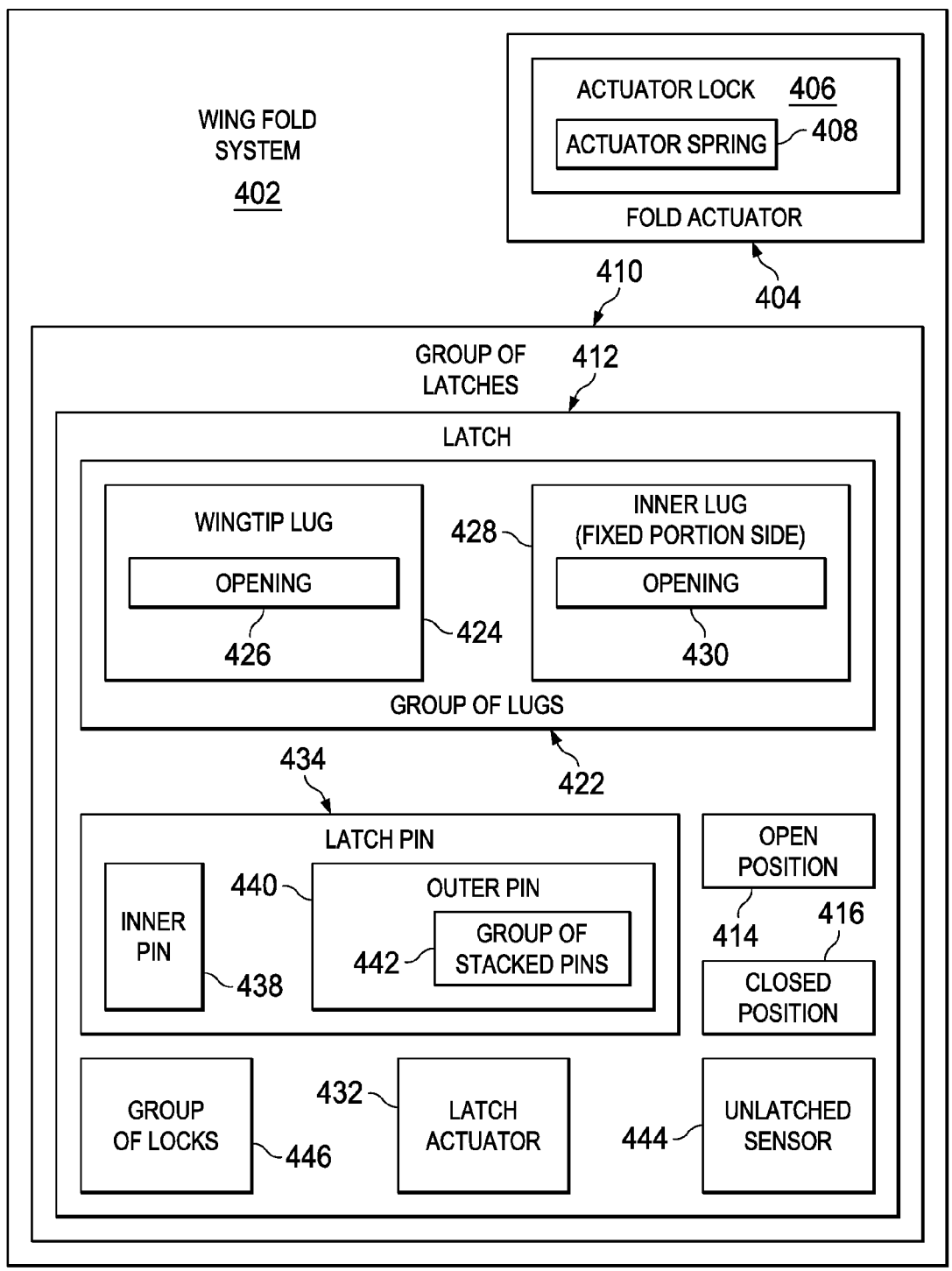
FIG. 4 is a block diagram of a wing fold system with a group of latches in accordance with an illustrative embodiment.

With reference to FIG. 4, FIG. 4 is a block diagram of a wing fold system with a group of latches in accordance with an illustrative embodiment. More specifically, wing fold system 402 may include wing 302, fold actuator 404, and group of latches 410. Wing fold system 402 may be an embodiment of wing fold system 318 of aircraft 100 of FIGS. 1, 2, and 3. Description of FIG. 4 may relate to, and use reference numbers from, FIG. 1, FIG. 2, and FIG. 3. Wing fold system 402 may transition wing 302 of an aircraft between flight position 304 and folded position 306 so that the aircraft may have a longer overall wingspan 132 during flight and a shorter overall wingspan 202 when not in flight.

Fold actuator 404 maybe a single chamber actuator or a dual chamber actuator and may include actuator lock 406. A single chamber actuator may reduce a weight of fold actuator 404. Reducing the weight of fold actuator 404 may increase a fuel efficiency for aircraft 100 of FIG. 1. Fold actuator 404 may be connected between unfixed portion 308 of wing 302 and fixed portion 312 of wing 302 and may provide a force that may move unfixed portion 308 wing 302 with respect to fixed portion 312 of wing 302. Fold actuator 404 may use hydraulic, pneumatic, or electrical, or other appropriate power, or any combination thereof, and may use linear or rotational motion, or any combination thereof. As depicted in FIG. 4, fold actuator 404 may be a linear hydraulic actuator.

Actuator lock 406 may include actuator spring 408. Actuator spring 408 may bias actuator lock 406 and may engage fold actuator 404 in an extended position. Actuator spring 408 may keep actuator lock 406 engaged. Actuator lock 406 may engage when fold actuator 404 may be in an extended position and, correspondingly, wing 302 may be in folded position 306. Actuator lock 406 may disengage when a pressure in a chamber of fold actuator 404 may provide sufficient force that may overcome a spring force from actuator spring 408 and release actuator lock 406.

Group of latches 410 may include latch 412. Group of latches 410 may secure wingtip 310 of wing 302 in flight position 304. Wing 302 may have a first latch in a forward portion of wing 302 and a second latch in an aft portion of wing 302 as a part of wing fold system 402.

Latch 412 may include group of lugs 422, latch actuator 432, latch pin 434, unlatched sensor 444, and group of locks 446. Latch 412 may secure fixed portion 312 of wing 302 to unfixed portion 308 of wing 302. Latch 412 may be in one of several positions including open position 414 and closed position 416.

Each latch 412 in group of latches 410 may optionally be canted with respect to an axis that may be parallel to a roll axis, or a longitudinal axis of an aircraft connected to wing 302. The roll axis may be a longitudinal axis that may extend from a tail to a nose of the aircraft, passing through a center of gravity of the aircraft. The roll axis may be substantially perpendicular to a vertical axis, and substantially perpendicular to a pitch axis for the aircraft. Each latch 412 in group of latches 410 may optionally be canted with respect an axis of rotation of unfixed portion 308 relative to fixed portion 312 of wing 302 on the aircraft. Canting each latch 412 may reduce the size of a fairing that might be required on wing 302 and may cover latch 412.

In open position 414, latch pin 434 may be fully retracted so that each wingtip lug 424 of group of lugs 422 may be free to move with respect to each inner lug 428 of group of lugs 422. Unfixed portion 308 of wing 302 may connect to wingtip lug 424 and may transition between folded position 306 and flight position 304. In open position 414, each lock of group of locks 446 may be in a disengaged position.

In closed position 416, latch pin 434 may be fully extended through group of lugs 422 and may prevent group of lugs 422 from moving with respect to each other, which thereby may prevent unfixed portion 308 of wing 302 from moving with respect to fixed portion 312 of wing 302. In closed position 416, each lock of group of locks 446 may be in an engaged position.

When transitioning between open position 414 and closed position 416, latch pin 434 may be partially extended through a portion of group of lugs 422. When transitioning between open position 414 and closed position 416, each lock of group of locks 446 may transition between an engaged position and a disengaged position.

Group of lugs 422 may include one or more wingtip lug 424 and one or more inner lug 428. Each lug of group of lugs 422 may include an opening through which latch pin 434 may move. Group of lugs 422 may secure unfixed portion 308 of wing 302 to fixed portion 312 of wing 302. Group of lugs of 422 may be interlaced when wing 302 may be in flight position 304.

Wingtip lug 424 may include opening 426 that may coincide with opening 430 of inner lug 428 and may facilitate entry of latch pin 434 within wingtip lug 424 and inner lug 428. Wingtip lug 424 may be attached to and may extend from wingtip 310 of unfixed portion 308 of wing 302.

Inner lug 428 may be attached to and may extend from fixed portion 312 of wing 302. Inner lug 428 may include opening 430 that may coincide with opening 426 of wingtip lug 424 and may facilitate entry of latch pin 234 within wingtip lug 424 and inner lug 428.

Latch actuator 432 may transition latch 412 between open position 414 and closed position 416 by moving latch pin 434. Latch actuator 432 may be a linear hydraulic actuator. Latch actuator 432 may use hydraulic, pneumatic, or electrical, or other appropriate power, or any combination thereof, and may use linear or rotational motion, or any combination thereof.

Latch pin 434 may be constructed as a pin with a pin, which may include inner pin 438 and outer pin 440. Latch pin 434 may interlock group of lugs 422 and may prevent unfixed portion 308 of wing 302 from moving with respect to fixed portion 312 of wing 302. Latch pin 434 may slide substantially parallel to a roll axis, an outermost rib of fixed portion 312 of wing 302, an axis of rotation of unfixed portion 308 relative to fixed portion 312 of wing 302 on the aircraft or a longitudinal axis, of an aircraft connected to wing 302. Each latch pin 434 may also be aligned canted relative to an axis as described immediately above.

Outer pin 440 may surround inner pin 438. Outer pin 440 may provide a load path between wingtip lug 424 and inner lug 428. Outer pin 440 may optionally include group of stacked pins 442. Outer pin 440 may be configured such that a first part of inner pin 438 may not provide the load path while a second part of outer pin 440, which may encircle first part of inner pin 438 may be providing the load path.

Inner pin 438 may provide a secondary pin to provide a secondary load path if outer pin 440 may be unable to provide the load path. Inner pin 438 may be not loaded until outer pin 440 may be unable to provide the load path. Inner pin 438 may be configured such that a gap may exist between outer pin 440 and inner pin 438. Inner pin 438 may be configured such that inner pin 438 does not directly contact outer pin 440.

Group of stacked pins 442 may separate load paths for groups of lugs 422. A first load path may include one or more first inner lugs, one or more first wingtip lug 424 and a first stacked pin of group of stacked pins 442. The first load path may be separate from a second load path that may include one or more second inner lug 428, one or more second wingtip lug 424 from group of lugs 422, and a second stacked pin of group of stacked pins 442. An inability of the first stacked pin to provide the first load path may be independent from an inability of the second stacked pin to provide the second load path.

Unlatched sensor 444 may sense when latch 412 may be in open position. Unlatched sensor 444 may be connected to latch actuator 432 and may sense based on contact with latch pin 434.

Group of locks 446 may prevent movement of latch pin 434 when latch 412 may be in closed position 416. First lock 502 of FIG. 5 of group of locks 446 may connect to second lock 602 of FIG. 6 of group of locks 446 so that operation of first lock 502 may be interdependent on operation of second lock 602.

Figure 5:
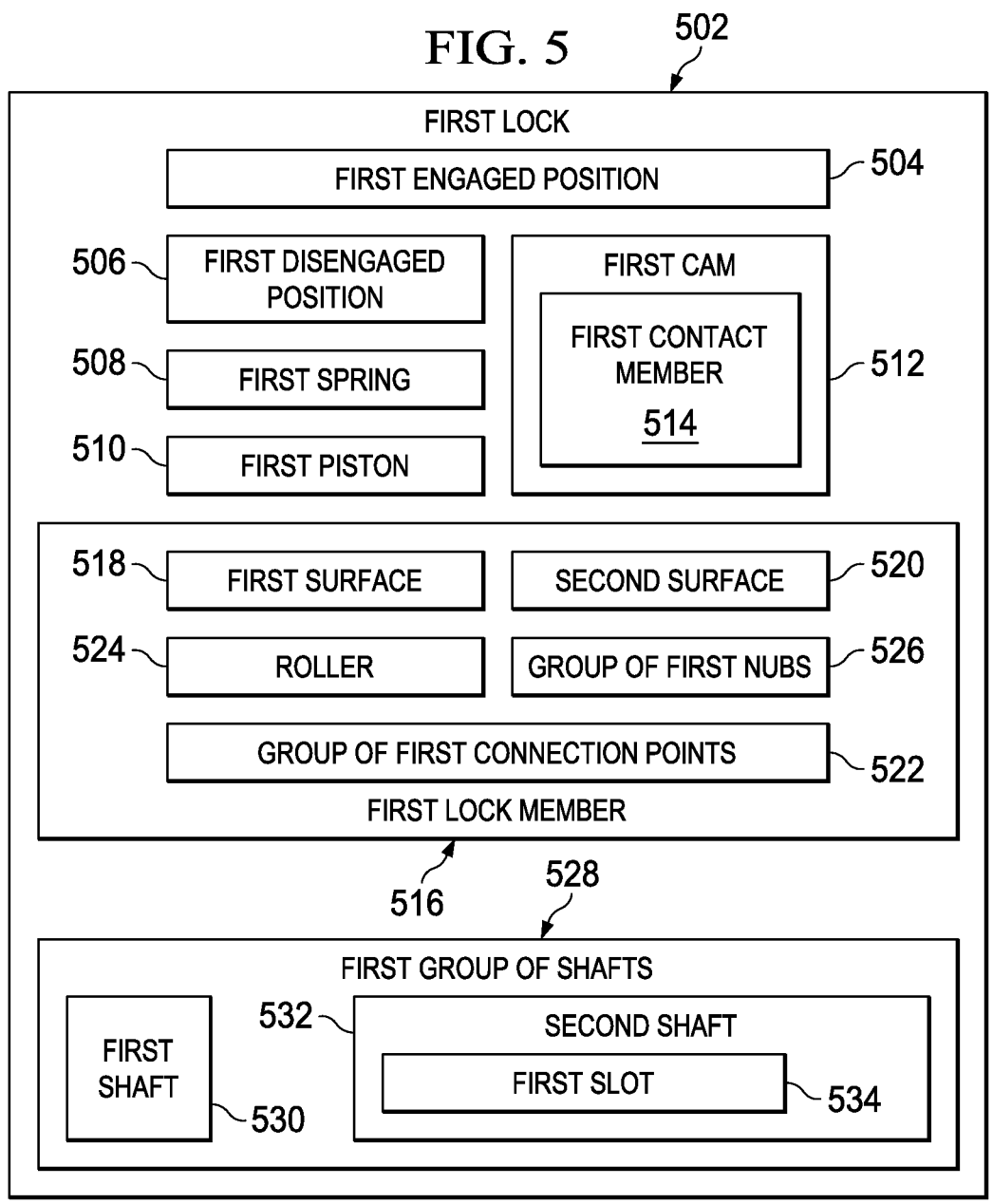
FIG. 5 is a block diagram of a first lock of a latch of a wing fold system in accordance with an illustrative embodiment.

With reference to FIG. 5, FIG. 5 is a block diagram of a first lock of a latch of a wing fold system in accordance with an illustrative embodiment. More specifically an illustration of a block diagram of first lock 502 of latch 412 of wing fold system 402 is depicted in accordance with an illustrative embodiment.

Description of FIG. 5 may relate to, and use reference numbers from, FIG. 1, FIG. 2, FIG. 3, and FIG. 4. First lock 502 may be an embodiment of first lock 502 of group of locks 446 of latch 412 of group of latches 410 of wing fold system 402 and wing fold system 318 of aircraft 100 of FIG. 1, FIG. 2, FIG. 3, and FIG. 4.

First lock 502 may include: first spring 508, first piston 510, first cam 512, first lock member 516, and first group of shafts 528. First lock 502 may engage latch pin 434 after latch pin 434 may be inserted into group of lugs 422. First lock 502 may transition between first engaged position 504 and first disengaged position 506.

First engaged position 504 may prevent latch pin 434 from transitioning away from closed position 416. When in first engaged position 504, a portion of first lock member 516 may contact a portion of latch pin 434 and may prevent latch pin 434 from moving.

First disengaged position 506 may allow latch 412 to transition between open position 414 and closed position 416. When in a fully disengaged position, first lock member 516 may not contact a portion of latch pin 434 and may not prevent latch pin 434 from moving. First lock member 516 may, when in a partially disengaged position, contact a portion of latch pin 434 but may not prevent latch pin 434 from moving.

First spring 508 may engage first lock member 516 and may bias first lock 502 to first engaged position 504. First spring 508 may be connected to second shaft 532 of first group of shafts 528.

First piston 510 may disengage first lock 502 and may transition first lock 502 to first disengaged position 506 by moving first lock member 516. First piston 510 may provide a sufficient force to overcome a first spring force of first spring 508. First piston 510 may be connected to first cam 512 and may transfer movement and force from first piston 510 to first lock member 516.

First cam 512 may include first contact member 514. First cam 512 may be shaped to inhibit second lock 602 from transitioning to second engaged position 604 until first lock 502 may be in first engaged position 504. First cam 512 may be shaped to inhibit first lock 502 from transitioning from first disengaged position 506 until second lock 602 has transitioned away from a second disengaged position.

First contact member 514 may be shaped so that when first lock 502 may be in first engaged position 504 and second lock 602 may be in second engaged position 604, contact between first contact member 514 of first cam 512 and second contact member 614 of second cam 612 may prevent first cam 512 and first lock 502 from transitioning away from first engaged position 504 before second lock 602 may transition away from second engaged position 604. First contact member 514 may be shaped so that when first lock 502 may be in first disengaged position 506, contact between first contact member 514 of first cam 512 and second contact member 614 of second cam 612 may prevent second cam 612 and second lock 602 from transitioning away from a second disengaged position before first lock 502 may transition away from first disengaged position 506. First contact member 514 may prevent second lock member 616 of second lock 602 from contacting latch pin 434 while latch pin 434 may be transitioning from open position 414 to closed position 416.

First lock member 516 may include: first surface 518, second surface 520, group of first connection points 522, roller 524, and group of first nubs 526. First lock member 516 may contact latch pin 434 and may prevent latch pin 434 from moving after latch pin 434 may be in closed position 416 to bring first lock 502 to first engaged position 504.

First surface 518 may minimize, via its shape, contact with latch pin 434. First surface 518 may minimize, via its shape, any combination of movement and rotation of first lock member 516 during transition to first disengaged position 506. First surface 518 may be shaped cylindrically with a curvature substantially similar a curvature of latch pin 434. First surface 518 may be angularly offset with respect to second surface 520.

Second surface 520 may minimize, via its shape, contact with latch pin 434 when first lock 502 may be in first disengaged position 506 and when latch 412 may transition from open position 414 to closed position 416. Second surface 520 may be shaped cylindrically with a curvature substantially similar to a curvature of latch pin 434. Second surface 520 may be angularly offset with respect to first surface 518.

Group of first connection points 522 may be connections between first lock member 516 and one or more shafts of first group of shafts 528. Each first connection point of group of first connection points 522 may be scalloped at first connections located between first lock member 516 and each shaft of first group of shafts 528. The scalloping at group of first connection points 522 may remove a torsional connection between first piston 510 and first lock member 516 when first lock member 516 and first shaft 530 of group of shafts 528 may be sheared by latch pin 434.

Roller 524 may reduce friction between first surface 518 of first lock member 516 and latch pin 434 as latch pin may 434 move into groups of lugs 422 that may be interlaced, and latch 412 may transition from open position 414 to closed position 416 and while first spring 508 may bias first lock 502 towards first engaged position 504. Roller 524 may be on a single lock member of a single lock of group of locks 446 due to an interdependent nature of group of locks 446 where first cam 512 with second cam 612 of second lock 602 may prevent second lock 602 member from contacting latch pin 434 while latch 412 may be in transition between open position 414 and closed position 416.

Group of first nubs 526 may extend from first lock member. Group of first nubs 526 may prevent first lock member 516 from moving too far in first engaged position 504. Group of first nubs 526 may create a group of first witness marks on latch pin 434 to aid inspection of latch pin 434. A quantity of nubs in group of first nubs 526 on first lock member 516 of first lock 502 may differ from a quantity of second nubs on a second lock and may identify that group of first nubs 526 may create a group of first witness marks. Group of first nubs 526 may be one nub.

First group of shafts 528 may include first shaft 530 and second shaft 532. First group of shafts 528 may connect various elements of first lock 502 and may transfer force and torque between the various elements of first lock 502.

Second shaft 532 may connect first spring 508 with first lock member 516. Second shaft 532 may transfer torque from first spring 508 to first lock member 516 and may transition first lock 502 to first engaged position 504 after latch 412 may be fully extended into closed position 416 between group of lugs 422, which may include an interlaced wingtip lug 424 and inner lug 428.

Second shaft 532 may include first slot 534 that when viewed, may indicate position of first lock member 516 as being in one of, or in between, first engaged position 504 and first disengaged position 506.

First shaft 530 may connect first lock member 516, first cam 512, and first piston 510. First shaft 530 may transfer resistance from first cam 512 to first lock member 516 and may prevent movement of first lock member 516 based on position of first cam 512 with respect to second cam 612 of second lock 602.

Figure 6:
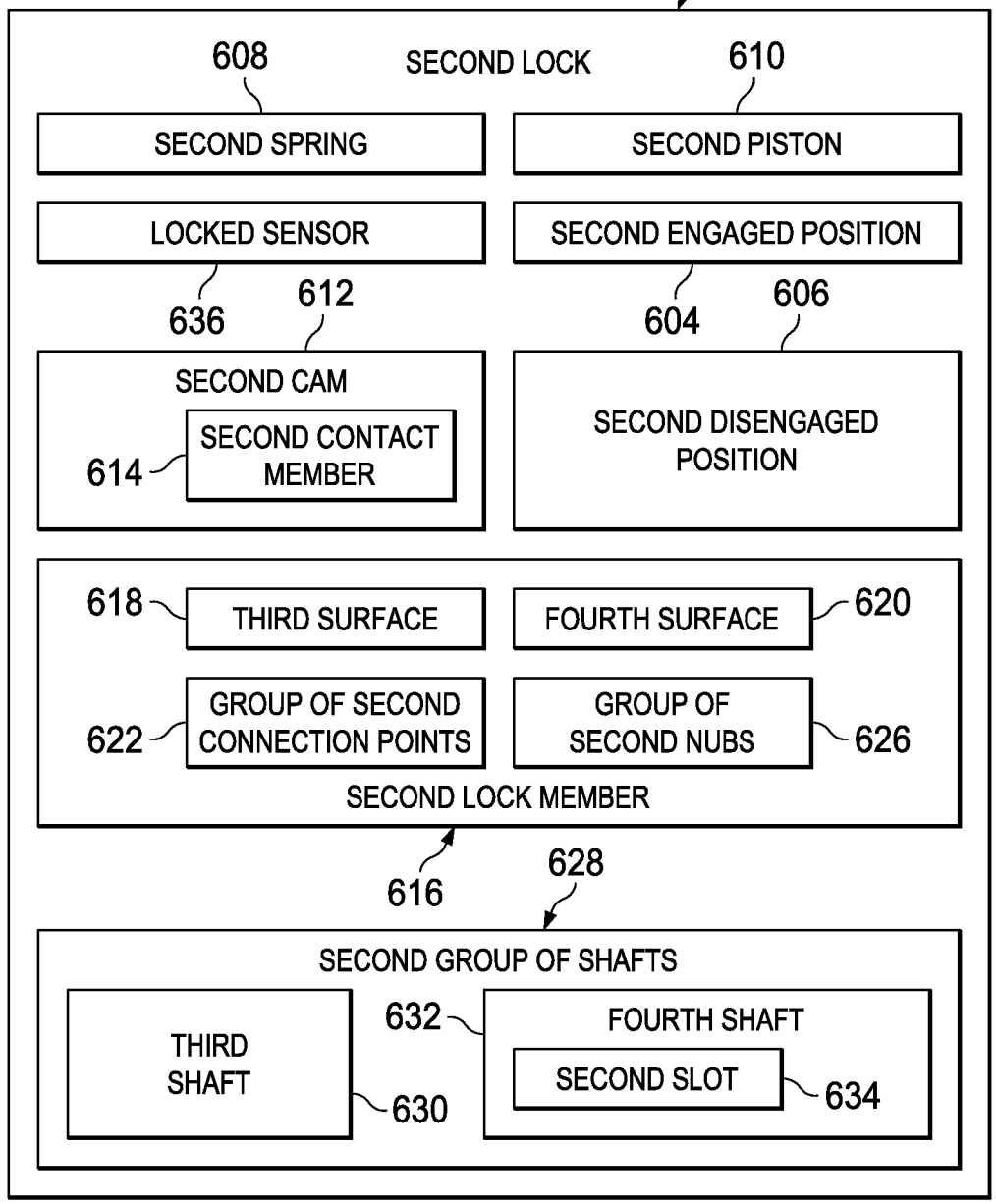
FIG. 6 is a block diagram of a second lock of a latch of a wing fold system in accordance with an illustrative embodiment.

With reference to FIG. 6, FIG. 6 is a block diagram of a second lock of a latch of a wing fold system in accordance with an illustrative embodiment. More specifically, an illustration of a block diagram of second lock 602 of latch 412 of wing fold system 402 is depicted in accordance with an illustrative embodiment. Description of FIG. 6 may relate to, and use reference numbers from, FIG. 1, FIG. 2, FIG. 3, FIG. 4, and FIG. 5.

Second lock 602 may include: second spring 608, second piston 610, second cam 612, second lock member 616, and second group of shafts 628, and locked sensor 636. Second lock 602 may be an embodiment of second lock 602 of group of locks 446 of latch 412 of group of latches 410 of wing fold system 402 and wing fold system 318 of aircraft 100 of FIGS. 1, 2, 3, and 4. Second lock 602 may engage latch pin 434 after latch pin 434 is inserted into group of lugs 422. Second lock 602 may transition between second engaged position 604 and second disengaged position 606.

Second engaged position 604 may prevent latch pin 434 from transitioning away from closed position 416. When in second engaged position 604, a portion of first lock member 516 may contact a portion of latch pin 434 and may prevent latch pin 434 from moving. When in second engaged position 604, second cam 612 may prevent first cam 512 from moving, which may prevent first lock member 516 from moving.

Second disengaged position 606 may allow latch 412 to transition between open position 414 and closed position 416. When in a fully disengaged position, second lock member 616 may not contact a portion of latch pin 434 and may not prevent latch pin 434 from moving. When in a partially disengaged position, second lock member 616 may contact a portion of latch pin 434 but may not prevent latch pin 434 from moving.

Second spring 608 may engage second lock 602 and may bias second lock 602 to second engaged position 604. Second spring 608 may connect to fourth shaft 632 of second group of shafts 628.

Second piston 610 may disengage second lock 602 and may transition second lock 602 to disengaged position 606 by moving second lock member 616. Second piston 610 may provide a sufficient force to overcome a second spring force of second spring 608. Second piston 610 may connect to second cam 612 and may transfer movement and force from second piston 610 to second lock member 616.

Second cam 612 may include second contact member 614. Second cam 612 may be shaped to inhibit second lock 602 from transitioning to second engaged position 604 until first lock 502 may be in first engaged position 504. Second cam 612 may be shaped to inhibit first lock 502 from transitioning from first disengaged position 506 until second lock 602 may have transitioned away from second disengaged position 606.

Second contact member 614 may be shaped so that when first lock 502 may be in first engaged position 504 and second lock 602 may be in second engaged position 604, contact between first contact member 514 of first cam 512 and second contact member 614 of second cam 612 may prevent first cam 512 and first lock 502 from transitioning away from first engaged position 504 before second lock 602 may transition away from second engaged position 604. Second contact member 614 may be shaped so that when first lock 502 may be in first disengaged position 506, contact between first contact member 514 of first cam 512 and second contact member 614 of second cam 612 may prevent second cam 612 and second lock 602 from transitioning away from second disengaged position 606 before first lock 502 may transition away from first disengaged position 506. Second contact member 614 may prevent second lock member 616 of second lock 602 from contacting latch pin 434 while latch pin 434 may be transitioning from open position 414 to closed position 416.

Second lock member 616 may include: third surface 618, fourth surface 620, group of second connection points 622, and group of second nubs 626. Second lock member 616 may contact latch pin 434 and may prevent latch pin 434 from moving after latch pin 434 may be in closed position 416 and first lock 502 may be in first engaged position 504 to bring second lock 602 to second engaged position 604.

Third surface 618 may minimize, via its shape, contact with latch pin 434. Third surface 618 may minimize, via shape, any combination of movement and rotation of second lock member 616 during transition to second disengaged position 606. Third surface 618 may be shaped cylindrically with curvature substantially similar to latch pin 434 curvature of latch pin 434. Third surface 618 may be angularly offset with respect to fourth surface 620.

Fourth surface 620 may minimize, via its shape, contact with latch pin 434 when second lock 602 may be in second disengaged position 606 and when latch 412 may transition from open position 414 to closed position 416. Fourth surface 620 may be shaped cylindrically with curvature substantially similar to latch pin 434 curvature of latch pin 434. Fourth surface 620 may be angularly offset with respect to third surface 618.

Group of second connection points 622 are connections between second lock member 616 and one or more shafts of second group of shafts 628. Each second connection point of group of second connection points 622 may be scalloped at second connections located between second lock member 616 and each shaft of second group of shafts 628. The scalloping at second connection points 622 may remove torsional connection between second lock member 616 and locked sensor 636 when second lock member 616 and third shaft 630 of group of shafts 628 may be sheared by latch pin 434.

Group of second nubs 626 may prevent second lock member 616 from moving too far in second engaged position 604. Group of second nubs 626 may create a group of second witness marks on latch pin 434 to aid inspection of latch pin 434. A quantity of second nubs of second lock 602 may differ from a quantity of first nubs of first lock 502 and may identify that group of second nubs may create group of second witness marks.

Second group of shafts 628 may include third shaft 630 and fourth shaft 632. Second group of shafts 628 may connect various elements of second lock 602 and may transfer force and torque between the various elements of second lock 602.

Fourth shaft 632 may connect second spring 608 with second lock member 616. Fourth shaft 632 may transfer torque from second spring 608 to second lock member 616 and may transition second lock 602 to second engaged position 604 after latch 412 may be fully extended into closed position 416 between group of lugs 422, which may include a wingtip lug 424 interlaced with an inner lug 428. Fourth shaft 632 may include second slot 634 that when viewed, may indicate position of second lock 602 as being in one of or in between second engaged position 604 and second disengaged position 606.

Third shaft 630 may connect second lock member 616, second cam 612, and second piston 610. Third shaft 630 may transfer resistance from second cam 612 to second lock member 616 and may prevent movement of second lock member 616 based on position of second cam 612 with respect to first cam 512 of first lock 502.

Locked sensor 636 may sense when second lock 602 may be in second engaged position 604. Second lock 602 being in second engaged position 604 may require first lock 502 to be in first engaged position 504 and latch pin 434 to be in between group of lugs 422 such that latch 412 may be in closed position 416. Locked sensor 636 may include a redundant set of sensors. Locked sensor 636 may be any one of: an ultrasonic sensor, and electrical sensor, a mechanical contact sensor, other sensor systems as may be appropriate, or any combination thereof.

Figure 7A:
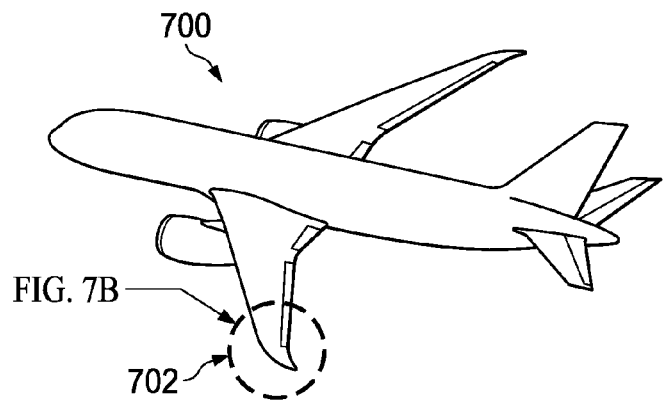
FIGS. 7A and 7B, are a diagram of a wing fold system in a wing accordance with an illustrative embodiment.
Figure 7B:
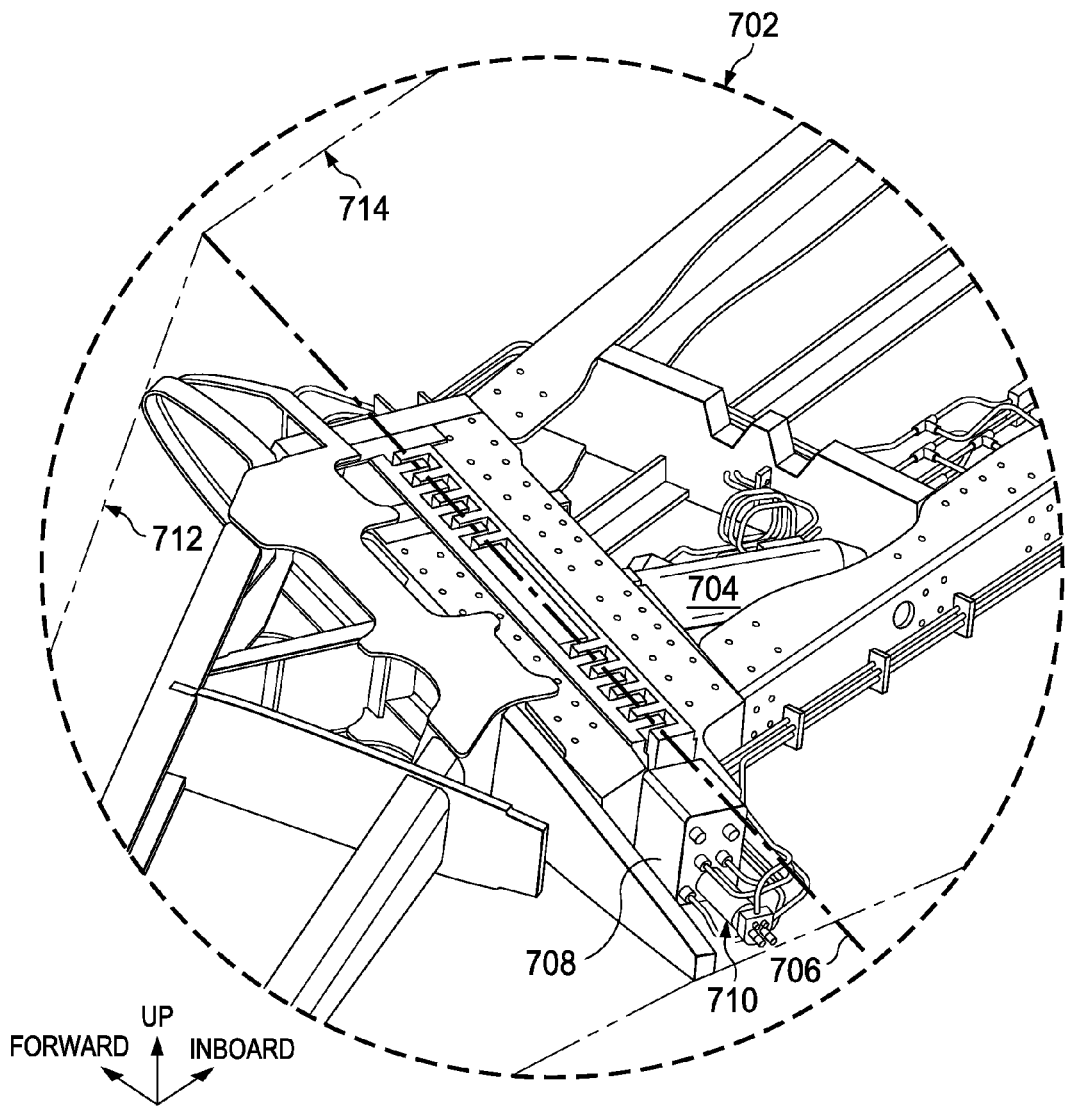

With reference to FIG. 7, FIG. 7, is a diagram of a wing fold system in a wing accordance with an illustrative embodiment, FIG. 7A is a diagram of a location of a wing fold system in a wing, FIG. 7B is a perspective top view diagram of selected elements of a wing fold system with the wing in a flight position in accordance with an illustrative embodiment. More specifically, FIG. 7A depicts a location for wing fold system 702 on aircraft 700, in accordance with an illustrative embodiment. The illustration presents an area of a left wingtip of aircraft 700, such as shown for unfixed portion 122 of aircraft 100 in FIG. 1. An inverse arrangement may be applicable for a right wingtip of an aircraft such as shown for unfixed portion 120 of aircraft 100 in FIG. 1.

With reference to FIG. 7B, wing fold system 702 may include: fold actuator 704, centerline of rotation 706, second latch 708, second latch actuator 710, unfixed portion 712, fixed portion 714. Second latch 708 may be an example of an embodiment of latch 412 as shown in FIG. 4. A first latch may be located at a forward edge of the wing fold system, but is not visible in this view. Unfixed portion 712 may be rotatably connected to fixed portion 714 about centerline of rotation 706 of unfixed portion 712.

Figure 8:
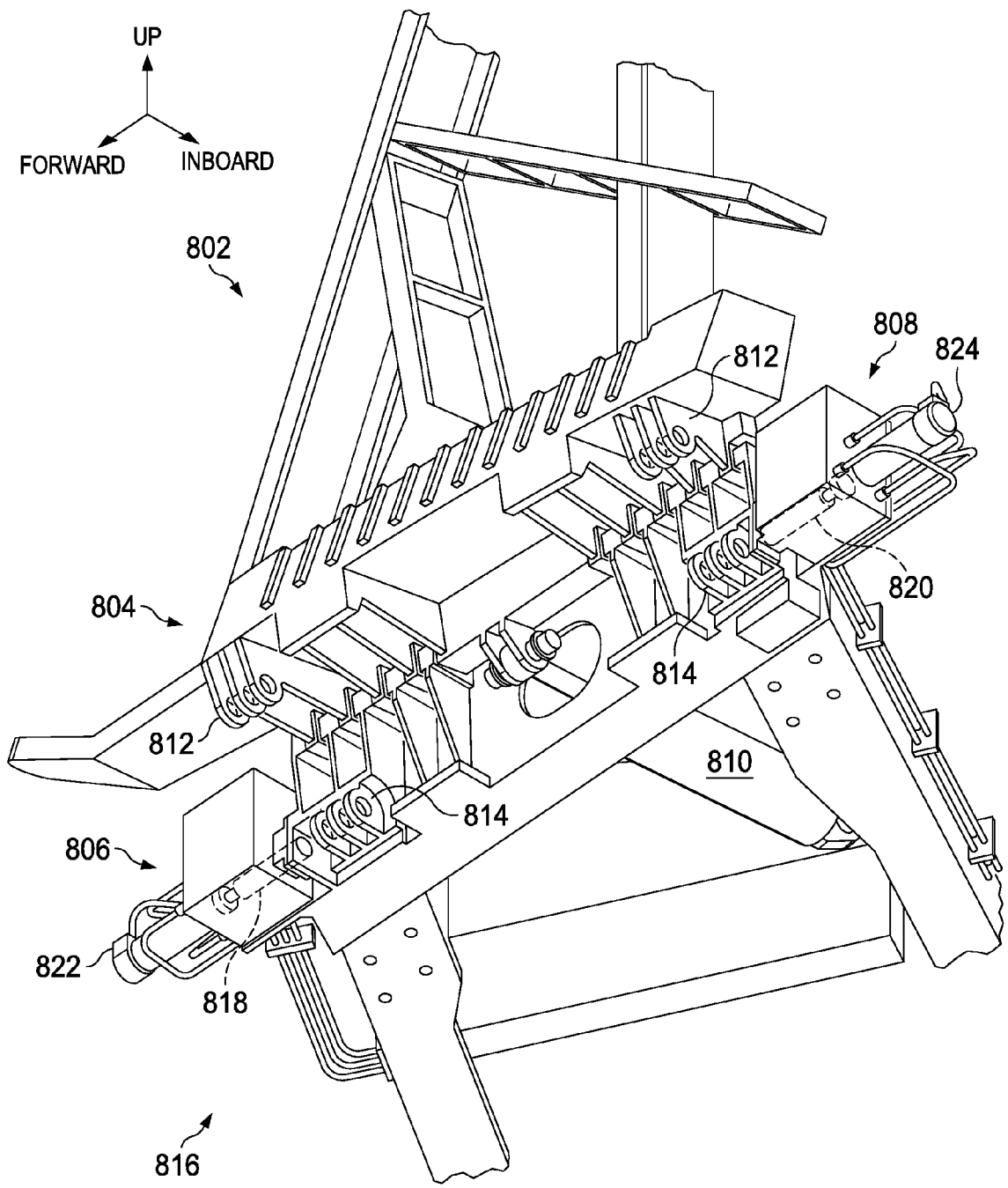
FIG. 8 is a perspective view diagram of wing fold system with a wing in a folded position in accordance with an illustrative embodiment.

With reference to FIG. 8, FIG. 8 is a perspective view diagram of wing fold system with a wing in a folded position in accordance with an illustrative embodiment. More specifically, the side perspective viewpoint looks up and in toward fixed portion 816 of wing fold system 802 in folded position 306. Wing fold system 802 is shown with unfixed portion 804 of wing 302 raised in folded position 306.

Wing fold system 802 may include: unfixed portion 804, first latch 806, second latch 808, fold actuator 810, wingtip lug 812 of group of lugs 422, inner lug 814 of group of lugs 422, and fixed portion 816, a first latch pin 818, and a second latch pin 820.

First latch 806 and second latch 808 may each be examples of latch 412 in group of latches 410 as shown in FIG. 4. Unfixed portion 804 may be in folded position 306 due to extension of fold actuator 810 while first latch pin 818 within first latch 806 and second latch pin 820 within second latch 808 may each be retracted to open position 414, by first latch actuator 822 and second latch actuator 824 respectively. First latch actuator 822 and second latch actuator 824 may each be an example of latch actuator 432 in FIG. 4. In open position 414, each latch actuator may retract its respective latch pin from engagement with group of lugs 422, such as wingtip lug 812 on unfixed portion 804 and inner lug 814 on fixed portion 816.

Figure 9:
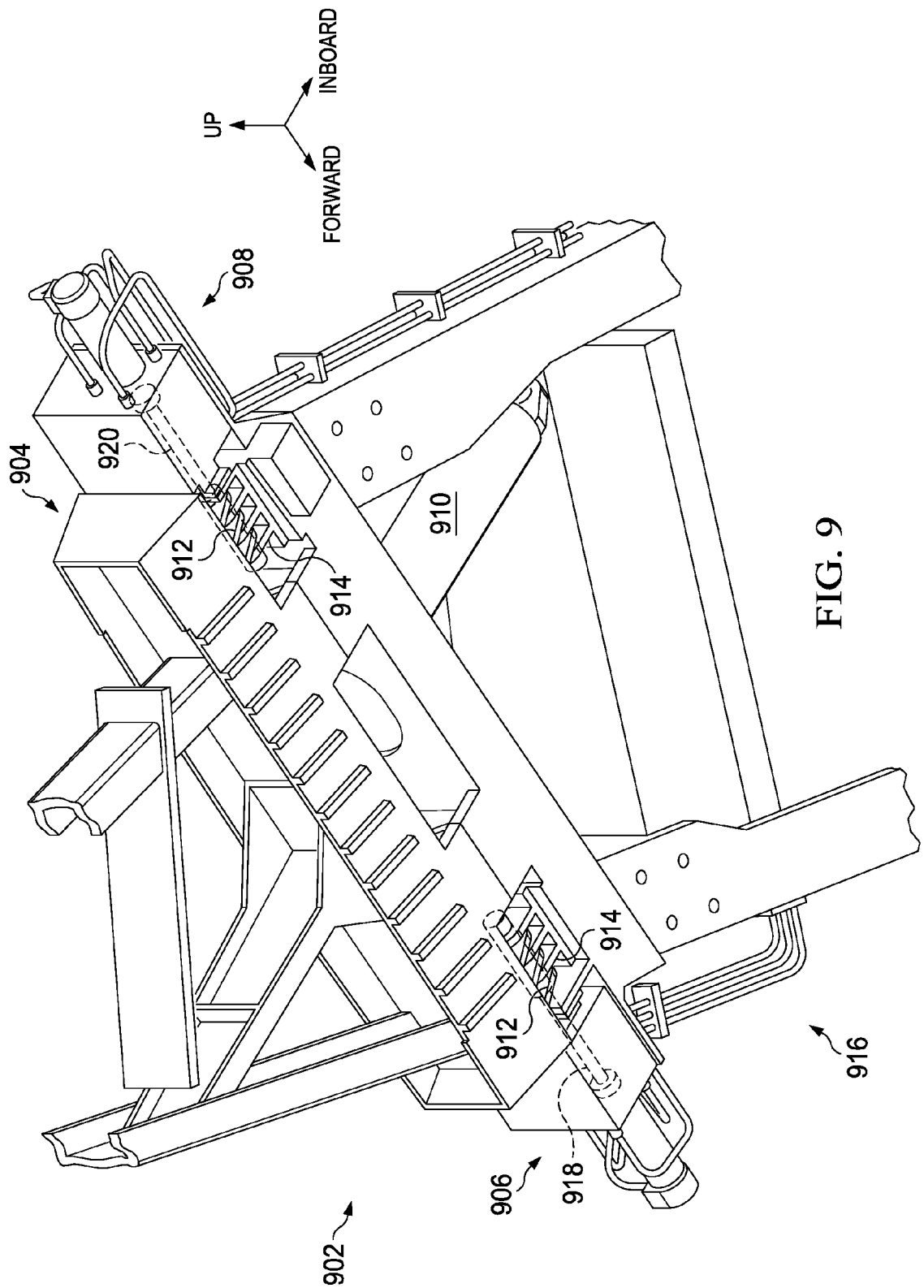
FIG. 9 is a perspective view diagram of wing fold system with a wing in a flight position in accordance with an illustrative embodiment.

With reference to FIG. 9, FIG. 9 is a perspective view diagram of wing fold system with a wing in a flight position in accordance with an illustrative embodiment. More specifically, FIG. 9 presents a view looking up and in toward wing fold system 902 with unfixed portion 904 of wing 302 lowered in flight position 304. First latch 906 and second latch 908 may each be in closed position 416. First latch 906 and second latch 908 may each be examples of latch 412 in group of latches 410 as shown in FIG. 4. Retraction of an extension member of fold actuator 910 may have moved unfixed portion 904 to flight position 304. First latch pin 918 within first latch 906 and second latch pin 920 within second latch 908 may have been extended to closed position 416 by their respective latch actuator 432. In closed position 416, each latch actuator 432 may extend its latch pin 434 from engagement with group of lugs 422, such as wingtip lug 912 on unfixed portion 904 and inner lug 914 on fixed portion 916.

With reference to FIG. 10, FIG. 10 is a top view cutaway diagram of a latch pin from a latch of a wing fold system in accordance with an illustrative embodiment. FIG. 10A illustrates the latch pin with the latch in an open position, and FIG. 10B illustrates the latch pin with the latch in a closed position.

With reference to FIG. 10A, FIG. 10A illustrates the latch pin with the latch in an open position. More specifically, FIG. 10A, depicts latch pin 1002 in open position 414. In FIG. 10A, latch pin 1002 is shown of with an inner pin 1004, and an outer pin 1006. Outer pin 1006 may be a solid pin, or as shown in FIG. 10, outer pin 1006 may be group of stacked pins 1008. A first latch pin may be located at a front spar of wing 302. A second latch pin may be located at a rear spar of wing 302.

Group of lugs 422 for fixed portion 1034 may include a quantity greater than one inner lug 428 as shown in FIG. 4. Illustrative embodiments may provide for group of lugs 422 for fixed portion 1034, that may include a quantity of four inner lug 428 as shown in FIG. 10 as inner lug 1010, inner lug 1012, inner lug 1014, and inner lug 1016. For clarity of viewing of group of stacked pins 1008, group of lugs 422 for unfixed portion 308, which may interleave with group of lugs 422 from fixed portion 1034, are not shown in FIG. 10.

Group of lugs 422 for unfixed portion 308 may include a quantity greater than one wingtip lug 424. A quantity of three wingtip lug 424. Latch pin 1002 being configured including outer pin 1006, inner pin 1004, the quantity of four inner lug 428, and the quantity of three wingtip lug 424 may provide a redundancy for providing a load path between unfixed portion 308 and fixed portion 312 that may be equal or greater than current systems and methods, such as but not limited to those that may use eight latch pins that may slide through three or more lugs. First lock 1018, and second lock 1020 may provide redundancy to ensure that latch pin 1002 in closed position 416, as shown in FIG. 4, will remain in closed position 416 until commanded to open position 414.

Group of stacked pins 1008 may be configured such that group of stacked pins 1008 may not be directly in contact with inner pin 1004. An inner diameter of outer pin 1006 may be greater than an outer diameter of inner pin 1004. A space may separate inner pin 1004 from outer pin 1006 such that a load on outer pin is not applied to inner pin while the space between inner pin 1004 and outer pin 1006 exists.

Inner pin 1004 may have a retention nut 1036 connected at an end of inner pin 1004. Retention nut 1036 may provide a barrier that may assist retraction of group of stacked pins 1008 when inner pin 1004 is retracted. Retention bolt 1038 may extend from fixed portion 1034 across an extended diameter of opening 1028. If any part of inner pin 1004 were to become disconnected from latch actuator 1040, retention bolt 1038 may retain the part from exiting latch pin 1002 beyond retention bolt 1038.

Outer pin 1006 being over inner pin 1004 may provide a secondary strength for latch pin 1002. If one of inner pin 1004 or outer pin 1006 were unable to provide a load path, the other may be configured as strong enough to provide the load path. Redundant ability to carry the load path may keep group of lugs 422 in an interlaced engagement that may hold wing 302 in flight position 304. Outer pin 1006 including stacked pins 1008, instead of being a single element outer pin 1006, may add a further layer of redundancy to latch 412. If any one of the stacked pins 1008 were to unable to provide the load path, the other stacked pins may still be intact, and may provide load bearing capacity for outer pin 1006 for each of the undamaged stacks. Similarly, any abnormal load on any individual lug in group of lugs 422 may remain isolated at that lug by the stacked pin associated with the individual lug.

Providing layers of redundancy in each latch pin 434, may allow wing fold system 402 to hold unfixed portion 308 in flight position 304 without requiring space within, or adding weight to wing 302 that may be required by an additional latch system to provide redundancy. Less space and weight required allow wing 302 to be narrower and lighter, which may increase wing 302 performance and aircraft fuel efficiency. Inner pin 1004 being configured to only provide the load path when outer pin 1006 is unable to provide the load path may allow inner pin 1004 to be configured of a size, material, and strength to provide the load path until inspection and/or repair of outer pin 1006 is available. Size and strength of inner pin 1004 may be less than that required for single pin latches in current wing fold designs.

In open position 414 latch pin 1002 may be retracted from engagement with group of lugs 422 connected to fixed portion 1034 of wing 302, which may include inner lug 1010, inner lug 1012, inner lug 1014, and inner lug 1016. Inner lug 1010, inner lug 1012, inner lug 1014, and inner lug 1016 may each be an example of an embodiment of inner lug 428 shown in FIG. 4. Inner lug 1010, inner lug 1012, inner lug 1014, and inner lug 1016 may each include a respective opening 1022, opening 1024, opening 1026, and opening 1028.

In open position 414, end 1030 of latch pin 1002 may be retracted to fill opening 1022, but may not extend beyond edge 1032 of inner lug 1010. In open position 414, latch pin 1002 may be retracted from group of lugs 422 sufficiently to allow wingtip lug 424 to pass into spaces between inner lug 1010, inner lug 1012, inner lug 1014, and inner lug 1016, and unfixed portion 308 of wing 302 connected to wingtip lug 424 may transition between folded position 306 and flight position 304.

In open position 414, as shown in FIG. 10A, first lock 1018 may be in first disengaged position 506. In open position 414, as shown in FIG. 10A, second lock 1020 may be in second disengaged position 606.

With reference to FIG. 10B, FIG. 10B illustrates the latch pin with the latch in a closed position. More specifically, latch pin 1002 is shown in closed position 416. In closed position 416 latch pin 1002 may be retracted from engagement with group of lugs 422 connected to fixed portion 312 of wing 302, which may include inner lug 1010, inner lug 1012, inner lug 1014, and inner lug 1016. Inner lug 1010, inner lug 1012, inner lug 1014, and inner lug 1016 may each be an example of an embodiment of inner lug 428 shown in FIG. 4. In closed position 416, latch pin 1002 may be engaged with group of lugs 422 sufficiently to also engage with any wingtip lug 424 in spaces between inner lug 1010, inner lug 1012, inner lug 1014, and inner lug 1016, such that unfixed portion 308 of wing 302 connected to wingtip lug 424 may not move from flight position 304.

Figure 11A:
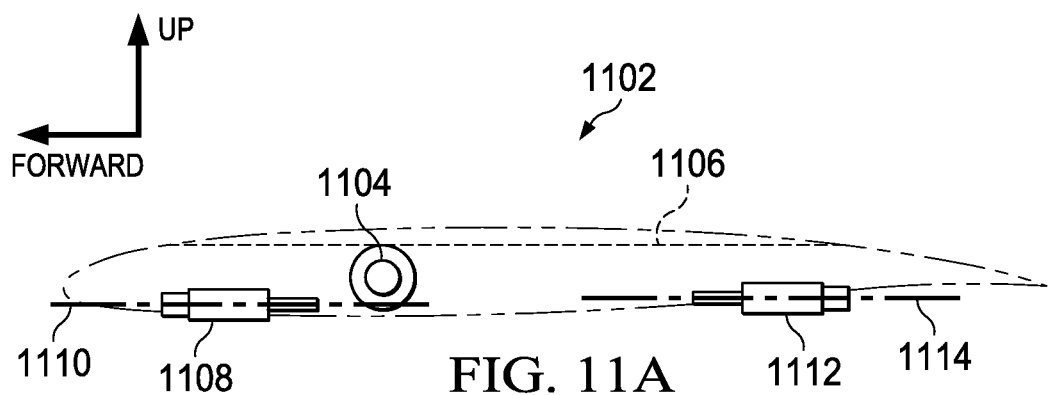
FIGS. 11A and 11B, are a side view diagram of a wing with a first latch pin and a second latch pin in accordance with an illustrative embodiment.
Figure 11B:
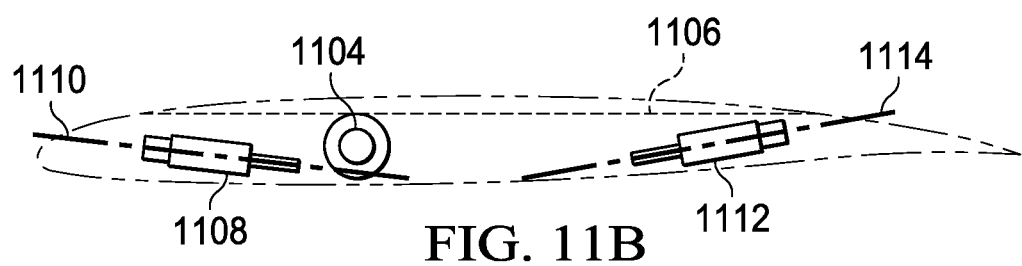

With reference to FIG. 11, a side view diagram of a wing with a first latch pin and a second latch pin is depicted in accordance with an illustrative embodiment. FIG. 11A is a side view diagram with a first central axis of the first latch pin and a second central axis of the second latch pin each being aligned substantially parallel to a centerline of rotation of an unfixed portion of the wing. FIG. 11B is a side view diagram with each central axis canted away from the centerline of rotation of the unfixed portion of the wing.

With reference to FIG. 11A, FIG. 11A is a side view diagram with a first central axis of the first latch pin and a second central axis of the second latch pin each being aligned substantially parallel to a centerline of rotation of an unfixed portion of the wing. FIG. 11B is a side view diagram with each central axis canted away from the centerline of rotation of the unfixed portion of the wing. More specifically, wing 1102 includes: fold actuator 1104, centerline of rotation 1106 of unfixed portion 308 of wing 1102, first latch pin 1108 with a first central axis 1110, second latch pin 1112 with a second central axis 1114. Centerline of rotation 1106 in FIG. 11 may be an example of an embodiment of centerline of rotation 706 in FIG. 7.

Orienting each latch pin in a generally horizontal alignment instead of in a generally vertical alignment may allow for thinner wing construction. Orienting each latch pin in a horizontal alignment instead of in a vertical alignment may enhance inspection of each latch pin condition or status, and may enhance repair, replacement, or manual activation or locking during maintenance on each latch pin. Similarly, a central axis of each latch pin may be essentially parallel to a length of a rib of wing 1102, or to an axis of rotation for unfixed portion 904.

With reference to FIG. 11B, FIG. 11B is a side view diagram with each central axis canted away from the centerline of rotation of the unfixed portion of the wing. More specifically, FIG. 11B depicts central axis 1110 of first latch pin 1108 and central axis 1114 of second latch pin 1112 each canted downward, in a direction of an extension of the respective latch pin and away from centerline of rotation 1106.

By canting central axis 1110 and/or central axis 1114, first latch pin 1108 and/or second latch pin 1112 may be inserted inside wing 1102 without requiring expanding a width of, or changing a shape of wing 1102 to accommodate the first latch pin 1108 and/or the second latch pin 1112. Without canting central axis 1110 and/or central axis 1114, as shown in FIG. 11A, the dimensions of each latch may exceed extend outside a desired shape and dimension of wing 1102. Canting central axis 1110 and/or central axis 1114 may allow keeping the desired shape and dimensions of wing 1102 and may allow wing 1102 to be narrower and/or lighter than if central axis 1110 and/or central axis 1114 are substantially parallel to centerline of rotation 1106 for unfixed portion 308 of wing 1102. Because a trailing edge of wing 1102 may be narrower than a leading edge of wing 1102, it may be that only the second latch pin, located closer to the trailing edge of wing 302, may be canted. A narrower and/or lighter wing 1102 may increase wing 1102 performance and efficiency and may increase aircraft 100 fuel efficiency.

Any canted latch pin may still pass through and engage group of lugs 422 in a manner similar to those depicted in FIG. 10A and FIG. 10B, with the exception that opening 1022, opening 1024, opening 1026 and opening 1028, which may be formed within respective inner lug 1010, inner lug 1012, inner lug 1014, and inner lug 1016, may each be formed at an angle that may be different than those depicted FIG. 10A and FIG. 10B, where the openings are identically shaped with a centerline that may be one of substantially horizontal, and substantially parallel to centerline of rotation 706. A centerline of each opening may align instead with an angle that may be substantially parallel to a cant angle of their respective latch pin. With a central axis of a latch canted, a shape of each opening may be different than a shape of each other opening to allow for an extension of a respective latch pin to extend and pass through each opening unimpeded.

Figure 12:
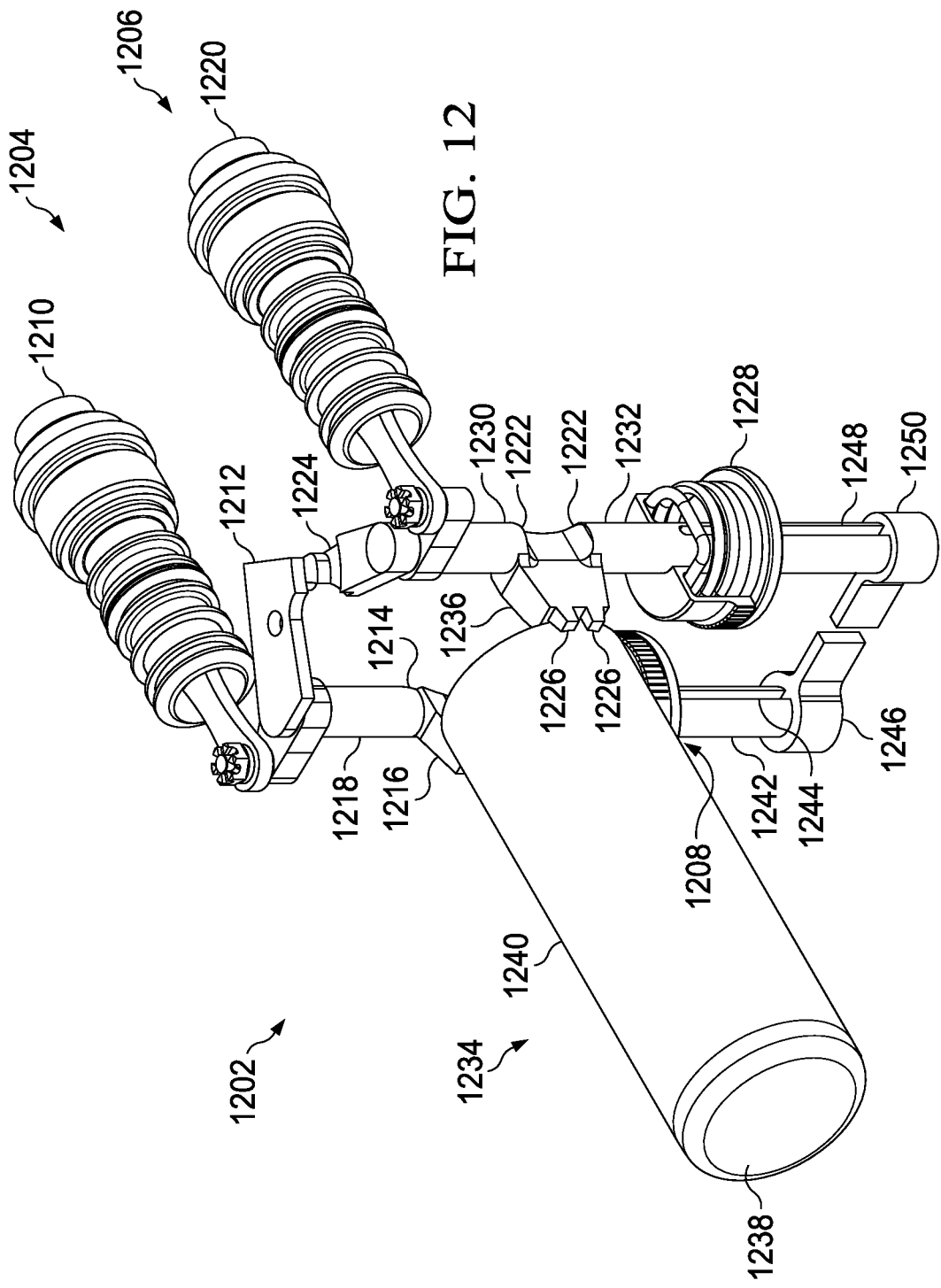
FIG. 12 is a perspective view diagram of selected components of a latch of a wing fold system of a wing in accordance with an illustrative embodiment.

With reference now to FIG. 12, a perspective view diagram of selected components of a latch of a wing fold system of a wing is depicted in accordance with an illustrative embodiment. More specifically, a perspective view of selected interior components of latch 1202 of wing fold system 402 is depicted from above in accordance with an illustrative embodiment. Latch 1202 may be an example of an embodiment of latch 412 of FIG. 4 such as second latch 708 of FIG. 7.

Latch 1202 may include: first lock 1204, second lock 1206, inner pin 1238, and outer pin 1240. First lock 1204 may include: first spring 1208, first piston 1210, first cam 1212, group of first connection points 1214, first lock member 1216, first shaft 1218, second shaft 1242, first slot 1244, and first knob 1246.

Group of first connection points 1214 may provide redundant features for latch 1202. Redundant features provided may include managed and sequenced shearing of first shaft 1218 and second shaft 1242 from first lock member 1216. First connection points 1214 may provide a stronger connection between first lock member 1216 and second shaft 1242 than first connection points 1214 provide between first lock member 1216 and first shaft 1218. Therefore, a shear force imparted to first lock member 1216 may result in a shear separation between first lock member 1216 and first shaft 1218 before a shear separation occurs between first lock member 1216 and second shaft 1242.

Thus, if first lock member 1216 shears apart from first shaft 1218, operation of first cam 1212 and second cam 1224 may be unaffected. Nonetheless, if first lock member 1216 shears apart from first shaft 1218, then a position of first lock member 1216 may be independent of and unaffected by movements of first cam 1212 and second cam 1224.

If latch pin 1234 is in closed position 416 when first lock member 1216 shears from first shaft 1218, then first spring 1208 may apply a force that may act on first lock member 1216 and may hold first lock member 1216 in first engaged position 504 against latch pin 1234. Despite a position of or an indication of a position of first cam 1212, a visual inspection of first slot 1244 in second shaft 1242 may indicate that first lock member 1216 may be in first engaged position 504 against latch pin 1234.

Accordingly, if latch pin 1234 is in open position 414 when first lock member 1216 shears from first shaft 1218, then, despite a position of or an indication of a position of first cam 1212, a visual inspection of first slot 1244 in second shaft 1242 may indicate an actual position for first lock member 1216, such as being in first disengaged position 506.

Additionally, if first lock member 1216 shears from first shaft 1218 when latch pin 1234 is in closed position 416, then any movement of first cam 1212 may be unable to move first lock member 1216 from first engaged position 504 to first disengaged position 506. If first lock member 1216 shears from first shaft 1218 when latch pin 1234 is in closed position 416, first knob 1246 may be used to overcome the force from first spring 1208 acting on first lock member 1216. Thus, first knob 1246 may be used to move first lock member 1216 between first engaged position 504 and first disengaged position 506. If first knob 1246 is connected to first lock member 1216 through second shaft 1242, then if latch pin 1234 is in open position 414, then first knob 1246 may not be able to move.

A redundant feature may be provided by first connection points 1214 between first lock member 1216 and second shaft 1242 being stronger than first connection points 1214 between first lock member 1216 and first shaft 1218. Thus, force imparted against first lock member 1216 may result in a shear separation at first connection points 1214 instead of transferring force and possible damage up through first shaft 1218 to first cam 1212 or first piston 1210.

Further, because first connection points 1214 between first lock member 1216 and second shaft 1242 may be stronger than first connection points 1214 between first lock member 1216 and first shaft 1218, it may be unlikely for a connection between first lock member 1216 and second shaft 1242 to suffer a shear separation without a connection between first lock member 1216 and first shaft 1218 suffering a shear separation first.

If first lock member 1216 shears from second shaft 1242, then first slot 1244 indications of a position of first lock member 1216 may be unreliable and first knob 1246 may not be used to move first lock member 1216. However, the redundant feature of first lock member 1216 being spring loaded to first engaged position 504 may be lost. A loss of first lock member 1216 being spring loaded to first engaged position 504 only becomes immediately significant if first lock member 1216 has also sheared from first shaft 1218. A shear separation of first group of shafts 528 may result in latch pin 1234 being unmovable except through maintenance servicing.

Second lock 1206 may include: second piston 1220, group of second connection points 1222, second cam 1224, group of second nubs 1226, second spring 1228, third shaft 1230, fourth shaft 1232, latch pin 1234, second lock member 1236, and second slot 1248, and second knob 1250.

Group of second connection points 1222 may provide redundant features for latch 1202. Redundant features provided may include managed and sequenced shearing of third shaft 1230 and fourth shaft 1232 from second lock member 1236. Second connection points 1222 may provide a stronger connection between second lock member 1236 and fourth shaft 1232 than second connection points 1222 provide between second lock member 1236 and fourth shaft 1232. Therefore, a shear force imparted to second lock member 1236 may result in a shear separation between second lock member 1236 and third shaft 1230 before a shear separation occurs between second lock member 1236 and fourth shaft 1232.

If latch pin 1234 is in closed position 416 when second lock member 1236 shears from third shaft 1230, then second spring 1228 may apply a force that may act on second lock member 1236 and may hold second lock member 1236 in second engaged position 604 against latch pin 1234. Despite a position of or an indication of a position of second cam 1224, a visual inspection of second slot 1248 in fourth shaft 1232 may indicate that second lock member 1236 may be in second engaged position 604 against latch pin 1234.

Accordingly, if latch pin 1234 is in open position 414 when second lock member 1236 shears from third shaft 1230, then, despite a position of or an indication of a position of second cam 1224, a visual inspection of second slot 1248 in fourth shaft 1232 may indicate an actual position for second lock member 1236, such as being in second disengaged position 606.

Additionally, if second lock member 1236 shears from third shaft 1230 when latch pin 1234 is in closed position 416, then any movement of second cam 1224 may be unable to move second lock member 1236 from second engaged position 604 to second disengaged position 606. Second cam 1224 movement may allow first cam 1212 movement, and first lock member 1216 may move to first disengaged position 506, but second spring 1228 may force second lock member 1236 to second engaged position 604 and latch pin 1234 may not move out of closed position 416.

If second lock member 1236 shears from third shaft 1230 when latch pin 1234 is in closed position 416, second knob 1250 may be used to overcome the force from second spring 1228 acting on second lock member 1236. Thus, second knob 1250 may be used to move second lock member 1236 between second engaged position 604 and second disengaged position 606. If second knob 1250 is connected to second lock member 1236 through fourth shaft 1232, then if latch pin 1234 is in open position 414, then second knob 1250 may not be able to move.

A redundant feature may be provided by second connection points 1222 between second lock member 1236 and fourth shaft 1232 being stronger than second connection points 1222 between 36 and third shaft 1230. Thus, force imparted against second lock member 1236 may result in a shear separation at second connection points 1222 instead of transferring force and possible damage up through third shaft 1230 to second cam 1224 or second piston 1220.

Further, because second connection points 1222 between second lock member 1236 and fourth shaft 1232 are stronger than second connection points 1222 between second lock member 1236 and third shaft 1230, it may be unlikely for a connection between second lock member 1236 and fourth shaft 1232 to suffer a shear separation without a connection between second lock member 1236 and third shaft 1230 suffering a shear separation first.

If second lock member 1236 shears from fourth shaft 1232, and second knob 1250 may not be used to move second lock member 1236. However, the redundant feature of second lock member 1236 being spring loaded to second engaged position 604 may be lost. A shear separation of second group of shafts 628 may result in latch pin 1234 being unmovable except through maintenance servicing.

With reference to FIGS. 13A through 13D, a top plan view diagram of a first cam, a first lock member, a second cam, a second cam member, and a latch pin of a latch is depicted in accordance with an illustrative embodiment.

Figure 13A:
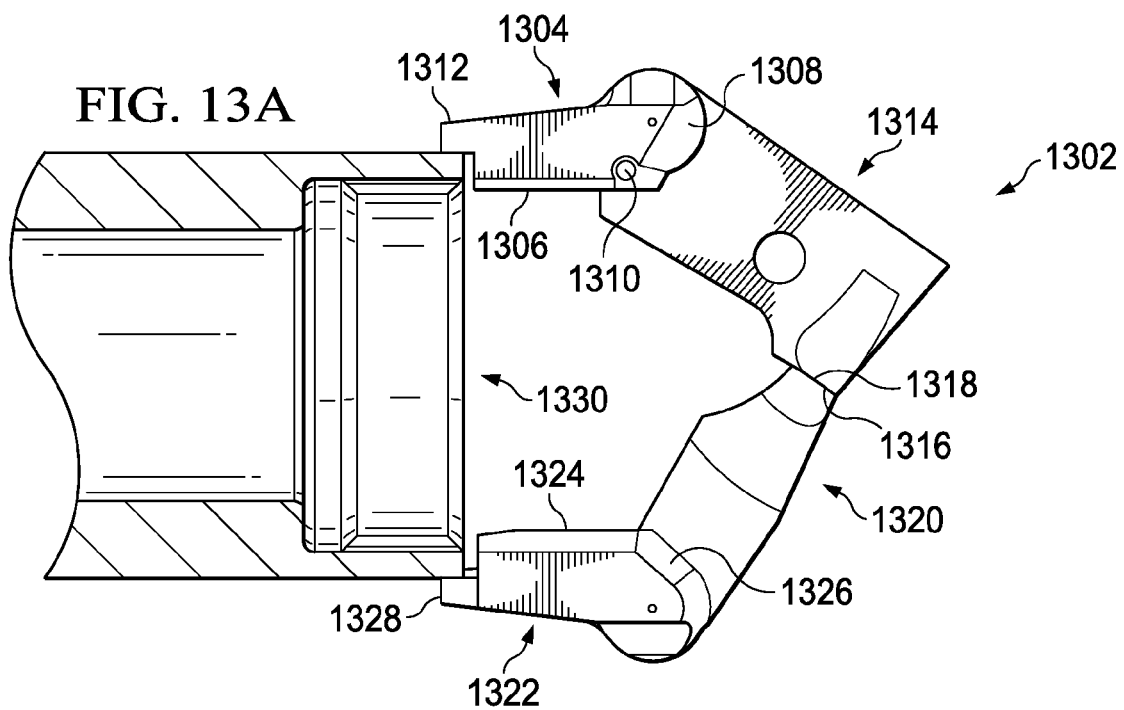
FIGS. 13A-13D, are a top plan view diagram of a first cam, a first lock member, a second cam, a second cam member, and a latch pin, of a latch depicted in accordance with an illustrative embodiment.
Figure 13B:
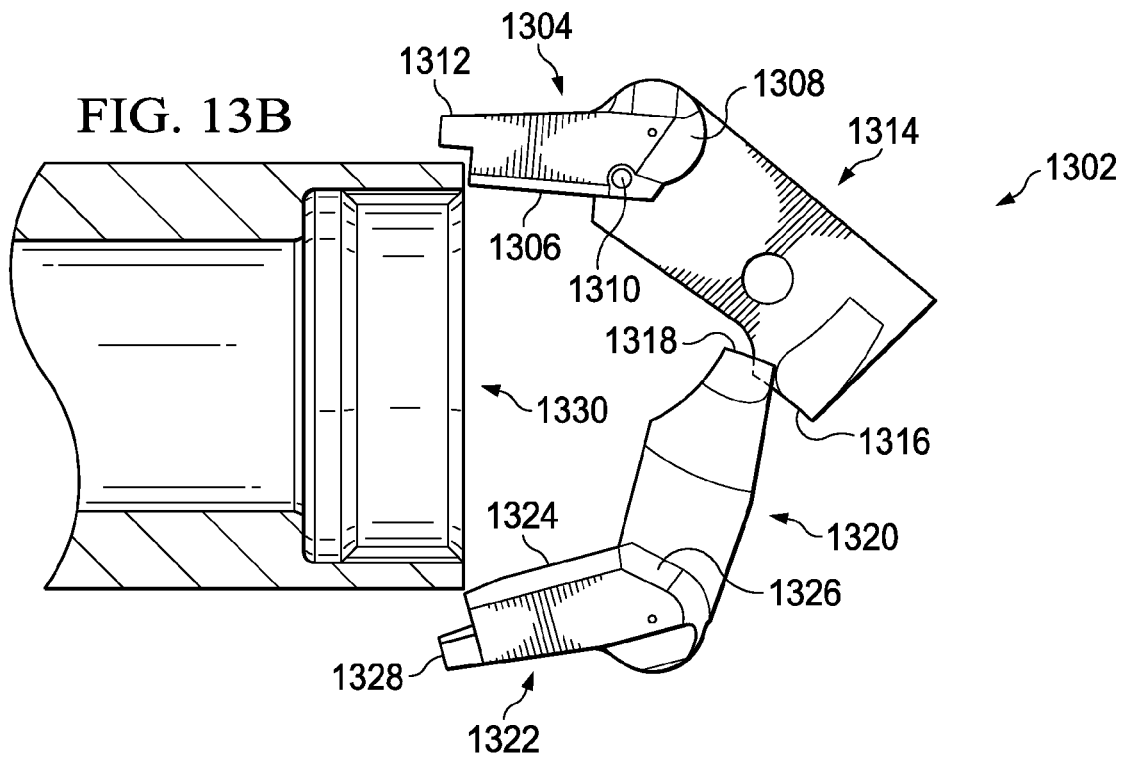
Figure 13C:
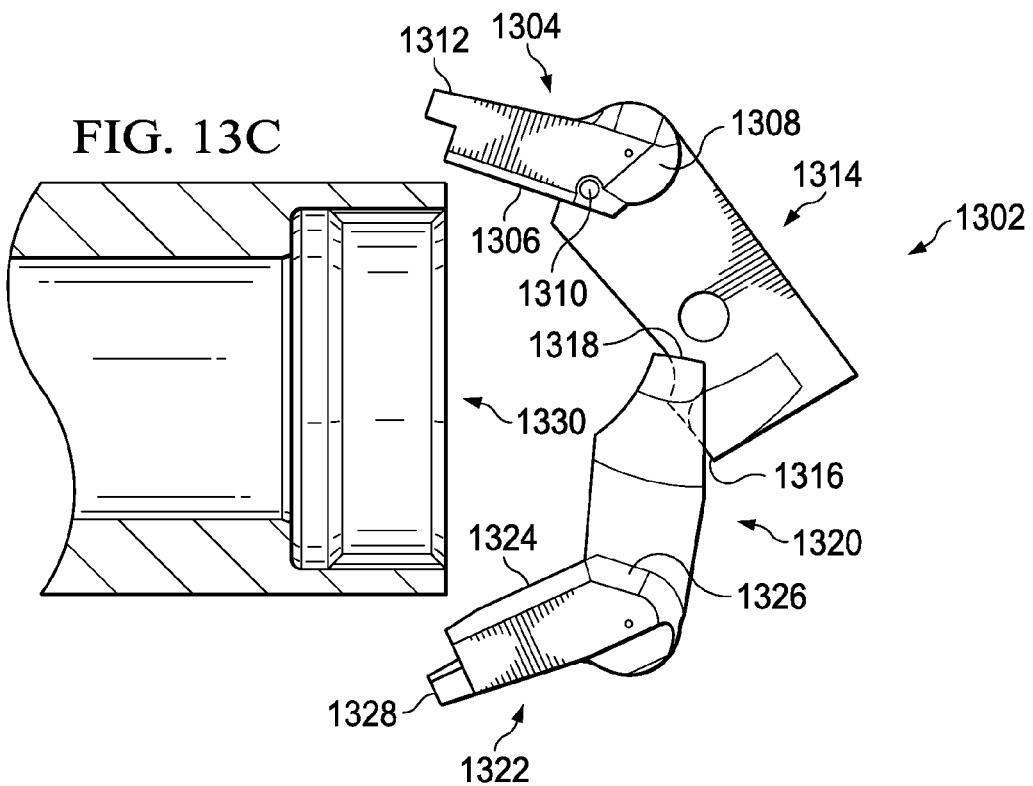
Figure 13D:
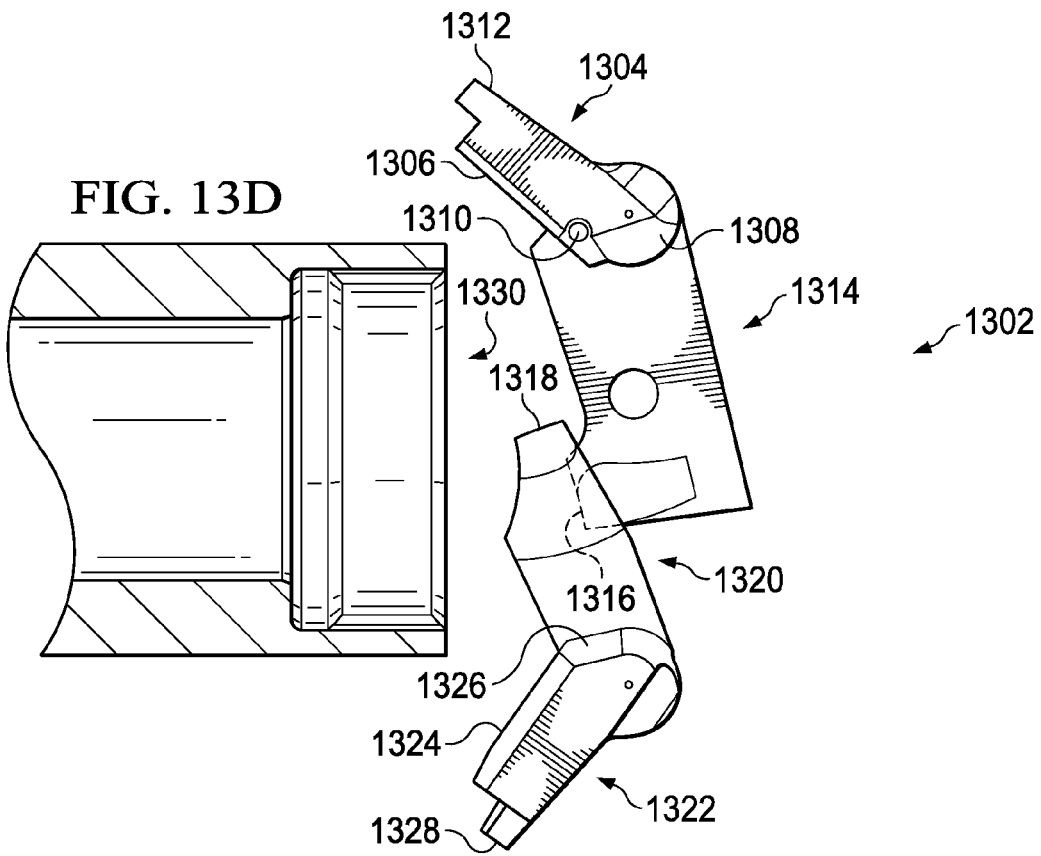

FIG. 13A depicts the latch in closed position, with the first lock member and the second lock member engaged with latch pin, FIG. 13B depicts the second locked member disengaging from the latch pin as first lock member remains engage with the latch pin, FIG. 13C depicts the second locked member further disengaging from the latch pin as first lock member disengages from the latch pin, and FIG. 13D depicts both the first lock member and the second lock member fully disengaged from the latch pin before the latch pin moves from closed position.

With reference to FIG. 13A, a top plan view diagram depicts latch 1302 in closed position. Latch 1302 may be an example of an embodiment of latch 412 of FIG. 4. Selected items of latch 1302 are depicted, which may include: first lock member 1304, first surface 1306, second surface 1308, roller 1310, group of first nubs 1312, first cam 1314, first contact member 1316, second contact member 1318, second cam 1320, second lock member 1322, third surface 1324, fourth surface 1326, group of second nubs 1328, and latch pin 1330.

Each of FIG. 13A through FIG. 13D, is a relational illustration to show the reactive movements of first lock member 1304 and second lock member 1322 as first cam 1314 and second cam 1320 move. For this relational illustrative purpose only, each lock member appears to be above each cam in FIG. 13A through FIG. 13D. In operation, first cam 1314 may be above first lock member 1304, with first cam 1314 directly connected to a top end of second shaft 532 and first lock member 1304 directly connected to a bottom end of second shaft 532. In operation, second cam 1320 may be above second lock member 1322 with second cam 1320 directly connected to a top end of fourth shaft 632 and second lock member 1322 directly connected to a bottom end of fourth shaft 632. In operation, latch pin 1330 may be below, and may not contact first cam 1314 or second cam 1320. In operation, latch pin 1330 may be at the same level as first lock member 1304 and second lock member 1322 and may contact first lock member 1304 and/or second lock member 1322.

FIG. 13A shows first contact member 1316 immobilized by second contact member 1318, first lock member 1304 in first engaged position 504, and second lock member 1322 in second engaged position 604. The relative positions shown in FIG. 13A may occur when first spring 508 may be forcing first lock member 1304 into first engaged position 504, and second spring 608 may be forcing second lock member 1322 into second engaged position 604. In these positions, first lock member 1304 may prevent latch pin 1330 from moving out of closed position 416, as shown, toward open position 414. In these positions, second lock member 1322 may redundantly prevent latch pin 1330 from moving out of closed position 416, as shown, toward open position 414. Contact of second contact member 1318 against first contact member 1316 may prevent movement of first cam 1314, regardless of any pressure that may be applied to first cam 1314 by first piston 510.

Group of first nubs 1312 may stop first spring 508 from moving first lock member 1304 further toward a center of latch pin 1330. If first lock member 1304 were allowed to rotate further toward the center of latch pin 1330, then first contact member 1316 may rotate away from contacting second contact member 1318. Group of second nubs 1328 may stop second spring 608 from moving second lock member 1322 further toward a center of latch pin 1330. If second lock member 1322 were allowed to rotate further toward the center of latch pin 1330, then second contact member 1318 may rotate away from contacting first contact member 1316, thus the second contact member 1318 may not provide a redundant means of preventing movement of first lock member 1304 out of first engaged position 504 until after second lock member 1322 may move out of second engaged position 604. Thus, group of first nubs 1312, and group of second nubs 1328, may facilitate sequencing of first lock member 1304 and second lock member 1322 with latch pin 1330, such that first lock member 1304 may not move out of first engaged position 504 until after second lock member 1322 may move out of second engaged position 604.

FIG. 13B shows that second cam 1320 may rotate toward latch pin 1330, and second contact member 1318 may move off first contact member 1316 of first cam 1314. Second cam 1320 rotation may be driven by second piston 610. Concurrently, second lock member 1322 may move off latch pin 1330. As second contact member 1318 moves off first contact member 1316, first piston 510 may force first cam 1314 to begin to rotate so that first lock member 1304 may begin to move away from latch pin 1330. Further rotation of first cam 1314 may still be blocked, as shown in FIG. 13B, by second cam 1320 position. A position of first lock member 1304, as shown in FIG. 13B, may still impede retraction of latch pin 1330, and may impede latch pin 1330 from moving to open position 414.

FIG. 13C shows that second cam 1320 may rotate further toward latch pin 1330, and second contact member 1318 may move away from first contact member 1316. First piston 510 may force first cam 1314 to rotate so that first lock member 1304 may move away from latch pin 1330. Further rotation of first cam 1314 may still be blocked, as shown in FIG. 13C, by second cam 1320 position. A position of first lock member 1304, as shown in FIG. 13C, may no longer block latch pin 1330 from moving away from closed position 416 toward open position 414.

FIG. 13D shows second contact member 1318 fully rotated away from first contact member 1316. Concurrently, second lock member may be rotated fully to second disengaged position 606. In this position, fourth surface 1326 of second lock member 1322 is aligned with a circumference of latch pin 1330 so that as latch pin 1330 moves toward open position 414, toward the right side of the diagram, second lock member 1322 may not inhibit movement of latch pin 1330.

With second cam 1320 rotated to position shown in FIG. 13D, first piston 510 may pull first cam 1314 to the position shown in FIG. 13D, and thus may rotate first lock member 1304 to first disengaged position 506, as shown in FIG. 13D. With first lock member 1304 in first disengaged position 506, when latch pin 1330 moves toward open position 414, latch pin 1330 may contact roller 1310 on first lock member 1304, but second surface 1308 may be aligned with a circumference of latch pin 1330 so that latch pin 1330 movement toward open position 414 may not be inhibited.

With second cam 1320 rotated to position shown in FIG. 13D, second cam 1320 may not be able to rotate back toward the second cam 1320 position shown in FIG. 13C until first spring 508 may force first cam 1314 toward the position shown for first cam 1314 in FIG. 13C. When first lock member 1304 and second lock member 1322 are in the positions shown in FIG. 13D, if latch pin 1330 is moved to right of diagram so that it passes between first lock member 1304 and second lock member 1322, then no motion of first cam 1314 or second cam 1320 may be possible until latch pin 1330 is moved back toward left of diagram, and fully to the left of second surface 1308 and fourth surface 1326.

Figure 14:
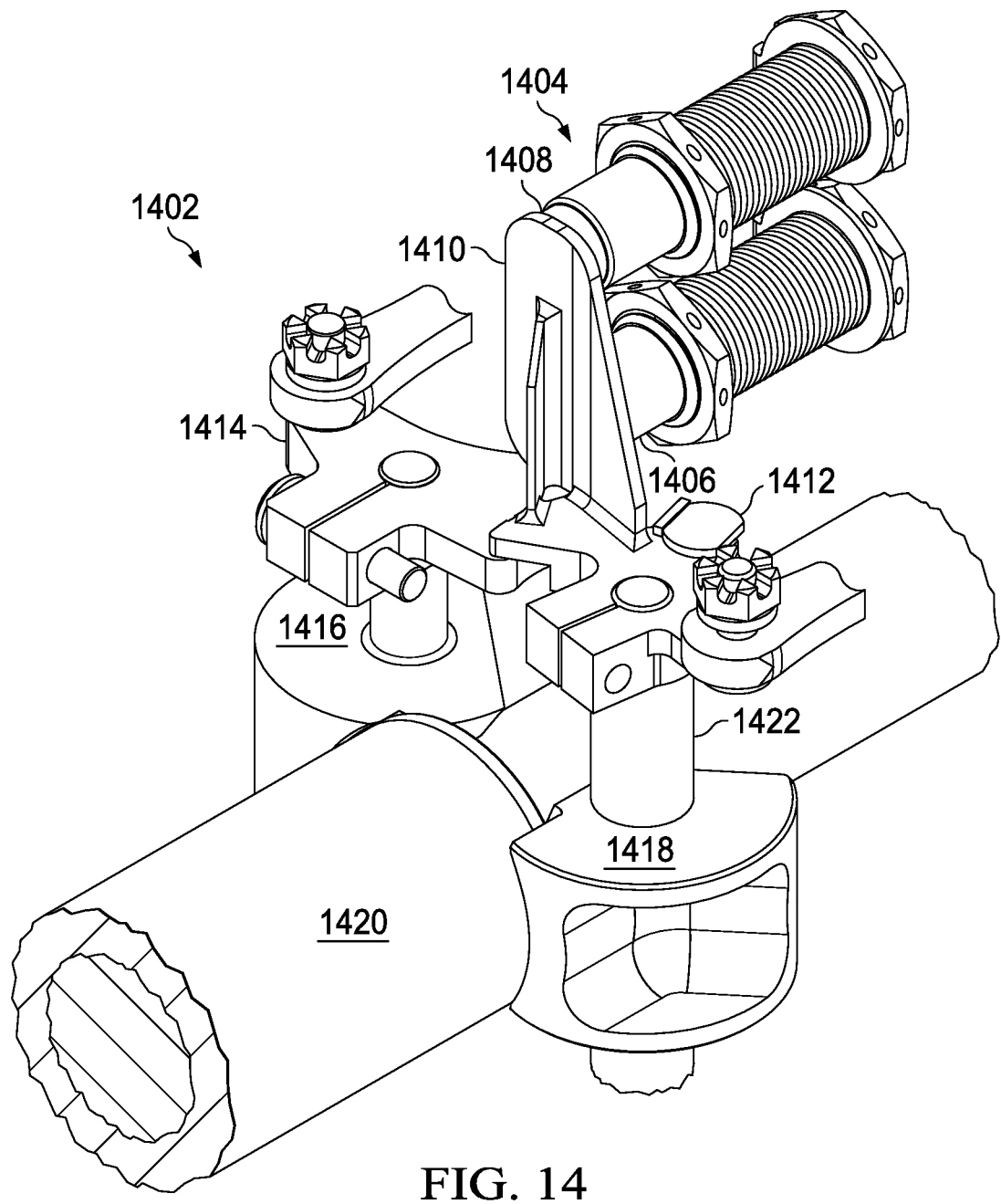
FIG. 14, is a perspective view diagram of a locked sensor for a latch on a wing fold system in accordance with an illustrative embodiment.

With reference to FIG. 14, a perspective view of a locked sensor for a latch on a wing fold system is depicted in accordance with an illustrative embodiment. More specifically, a perspective view looking down upon locked sensor 1404 of latch 1402 is shown. Locked sensor 1404 may be an example of an embodiment of locked sensor 636 of FIG. 6.

Locked sensor 1404 may include: first sensor 1406, second sensor 1408, target 1410, and second cam 1412. First sensor 1406 and second sensor 1408 may be identical sensing units, or sensing units of different design. Each sensing unit may operate using at least one of: ultrasonic sensing, electronic sensing, mechanical sensing, optical sensing, any other sensing system that may be appropriate, or any combination thereof. Target 1410 may be connected to and may extend upward from second cam 1412.

When second cam 1412 is in second engaged position 604, first sensor 1406 and second sensor 1408 may be activated by presence of target 1410. Because, as shown above in FIG. 13A through 13D, second cam 1412 may not be in second engaged position 604 unless first cam 1414 is in first engaged position 504, target 1410 activating first sensor 1406 and second sensor 1408 may also be an indication that first cam 1414 is in first engaged position 504.

When second cam 1412 is moved out of second engaged position 604, target 1410 moves away from first sensor 1406 and second sensor 1408, and locked sensor 1404 may not indicate that latch 1402 is in closed position 416 with first lock member 1416 in first engaged position 504 and second lock member 1418 in second engaged position 604, with latch pin 1420 extended into closed position 416.

As discussed for FIG. 12 above, third shaft 1422 may shear from second lock member 1418. If that shear occurs, then a position of second cam 1412 may not be indicative of a position of second lock member 1418. Thus, target 1410 may move away from first sensor 1406 and second sensor 1408, and locked sensor 1404 may incorrectly perceive that second lock member 1418 is not in second engaged position 604. Actual position of second lock member 1418 may be determined by viewing second slot 634 if fourth shaft 432 has not sheared from second lock member 1418.

Evaluation of various combinations of malfunctions of latch 1402 may be derived from a observing a combination of locked sensor 1404 indications, first slot 534, second slot 634, and latch pin 1420 locations. First spring 508 functions to hold first lock member 1416 in first engaged position 504 and second spring 608 functions to hold second lock member 1418 in second engaged position 604 so that the system may react to most likely shear separations by holding latch pin 1420 in closed position 416.

Thus, wing 302 may be maintained in flight position 304, which is a desirable redundant feature using wing 302 in flight. Additionally, an unexpected operation of latch pin 1420 that may deny ability to fold wing 302 may be addressed by not taxing an aircraft until wing 302 may be folded up by maintenance service or other procedures.

Figure 15A:
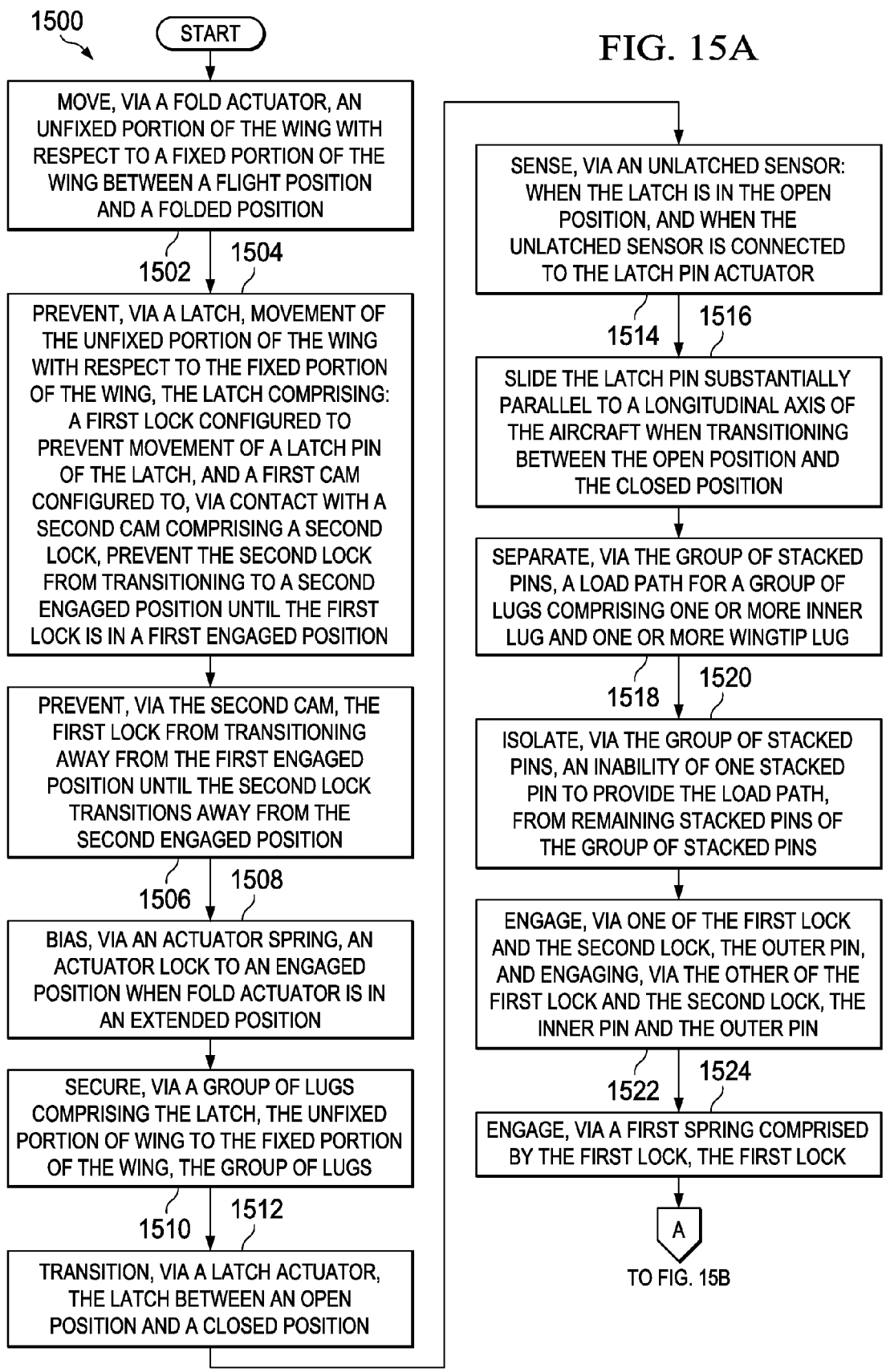
Figure 15C:
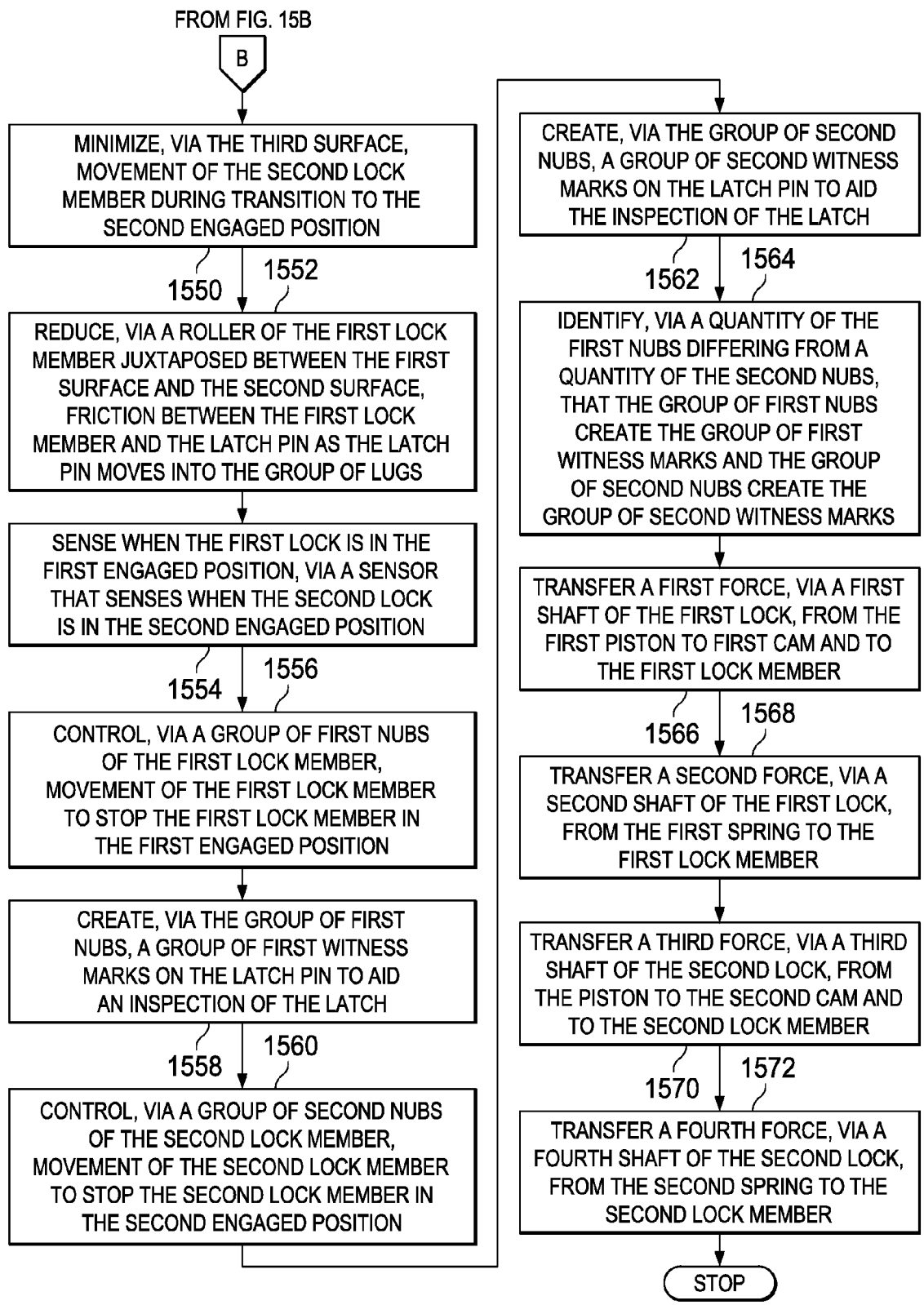

With reference to FIG. 15, FIG. 15 is a diagram of operations for a method of a wing fold system in accordance with an illustrative embodiment. The method may start with operation 1502 and end after operation 1572. FIG. 15A shows operations 1502 to 1524 of the method; FIG. 15B shows operations 1526 to 1548 of the method; and FIG. 15C shows operations 1550 to 1572 of the method. The various features and elements of the embodiment of FIG. 15 that are used to describe the method 1500 for folding and unfolding the wing of an aircraft, may correspond to similarly named features and elements of embodiments depicted in the other figures of this application.

Operations listed for method 1500 may be performed in order other than that presented. Some operations may be performed simultaneously. Some operations may be omitted. Operations other than those listed may be added. Performance of some operations, or ordering of operations, may be dependent upon a beginning state of the wing, such as flight position or folded position, or being in transition between states.

Method 1500 may include operations listed below. Moving, via a fold actuator, an unfixed portion of the wing with respect to a fixed portion of the wing between a flight position and a folded position (operation 1502). Method 1500 may include preventing, via a latch, movement of the unfixed portion of the wing with respect to the fixed portion of the wing, the latch comprising: a first lock configured to prevent movement of a latch pin of the latch, and a first cam configured to, via contact with a second cam comprising a second lock, prevent the second lock from transitioning to a second engaged position until the first lock is in a first engaged position (operation 1504). Further, method 1500 may include preventing, via the second cam, the first lock from transitioning away from the first engaged position until the second lock transitions away from the second engaged position (operation 1506).

Method 1500 may include biasing, via an actuator spring, an actuator lock to an engaged position when fold actuator is in an extended position (operation 1508). Method 1500 may include securing, via a group of lugs comprising the latch, the unfixed portion of wing to the fixed portion of the wing, the group of lugs (operation 1510). The group of lugs may include: one or more wingtip lug, each wingtip lug attached to the unfixed portion of the wing and each comprising a first opening that coincides with a second opening of an inner lug when the wing is in a flight position; and one or more inner lug, each inner lug attached to the fixed portion of the wing and each comprising the second opening that coincides with the first opening of a wingtip lug.

Method 1500 may also include transitioning, via a latch actuator, the latch between an open position and a closed position (operation 1512); and sensing, via an unlatched sensor: when the latch is in the open position, and when the unlatched sensor is connected to the latch pin actuator (operation 1514). Method 1500 also may include sliding the latch pin substantially parallel to a longitudinal axis of the aircraft when transitioning between the open position and the closed position (operation 1516). The latch pin may include: an inner pin within an outer pin, the inner pin providing a secondary load path if outer pin is unable to provide a load path, the inner pin not providing the load path for the outer pin until the outer pin is unable to provide the load path. The outer pin may comprise a group of stacked pins.

Method 1500 may include separating, via the group of stacked pins, a load path for a group of lugs comprising one or more inner lug and one or more wingtip lug (operation 1518), and isolating, via the group of stacked pins, an inability of one stacked pin to provide the load path, from remaining stacked pins of the group of stacked pins (operation 1520). Method 1500 may also include engaging, via one of the first lock and the second lock, the outer pin, and engaging, via the other of the first lock and the second lock, the inner pin and the outer pin (operation 1522).

Additionally, method 1500 may include engaging, via a first spring comprised by the first lock, the first lock (operation 1524); biasing, via the first spring, the first lock to the first engaged position (operation 1526); engaging, via a second spring comprised by the second lock, the second lock (operation 1528); and biasing, via the second spring, the second lock to the second engaged position (operation 1530). Further, method 1500 may include disengaging, via a first piston connected to the first cam, the first lock (operation 1532); transitioning, via the first piston, the first lock from the first engaged position to a first disengaged position (operation 1534); disengaging, via a second piston connected to the second cam, the second lock (operation 1536); and transitioning, via the second piston, the second lock from the second engaged position to a second disengaged position (operation 1538).

Method 1500 may include preventing, via a first contact member comprised by the first cam, the first lock from transitioning away from the first engaged position before the second lock transitions away from the second engaged position via contact between the first contact member of the first cam and the second contact member of the second cam when the first lock is in the first engaged position and the second lock is in the second engaged position (operation 1540). Method 1500 may also include preventing, via a second contact member comprised by the second cam, the second lock from transitioning to the second engaged position before the first lock transitions to the first engaged position via contact between the second contact member of second cam and the first contact member of the first cam before the first lock is in first engaged position (operation 1542).

Method 1500 may include minimizing, via a first surface of a first lock member of a first lock of the group of locks and a third surface of a second lock member of a second lock of the group of locks, contact with the latch pin in the closed position (operation 1544); minimizing, via a second surface of the first lock member of the first lock of the group of locks and a fourth surface of the second lock member of the second lock of the group of locks, contact with the latch pin while transitioning to the open position (operation 1546); minimizing, via the first surface, movement of the first lock member during transition to the first engaged position (operation 1548); and minimizing, via the third surface, movement of the second lock member during transition to the second engaged position (operation 1550). Additionally, method 1500 may include reducing, via a roller of the first lock member juxtaposed between the first surface and the second surface, friction between the first lock member and the latch pin as the latch pin moves into the group of lugs (operation 1552). Method 1500 may also include sensing when the first lock is in the first engaged position, via a sensor that senses when the second lock is in the second engaged position (operation 1554).

Method 1500 may include controlling, via a group of first nubs of the first lock member, movement of the first lock member to stop the first lock member in the first engaged position (operation 1556); creating, via the group of first nubs, a group of first witness marks on the latch pin to aid inspection of the latch (operation 1558); controlling, via a group of second nubs of the second lock member, movement of the second lock member to stop the second lock member in the second engaged position (operation 1560); and creating, via the group of second nubs, a group of second witness marks on the latch pin to aid the inspection of the latch (operation 1562). Accordingly, method 1500 may include identifying, via a quantity of the first nubs differing from a quantity of the second nubs, that the group of first nubs creates the group of first witness marks and the group of second nubs creates the group of second witness marks (operation 1564).

Method 1500 may include transferring forces from one component to another. Transferring forces may specifically include: transferring a first force, via a first shaft of the first lock, from the first piston to first cam and to the first lock member (operation 1566); transferring a second force, via a second shaft of the first lock, from the first spring to the first lock member (operation 1568); transferring a third force, via a third shaft of the second lock, from the piston to the second cam and to the second lock member (operation 1570); and transferring a fourth force, via a fourth shaft of the second lock, from the second spring to the second lock member (operation 1572). The first force may be great enough to overcome the second force. The third force may be great enough to overcome the fourth force. Thus, second piston may need to be operative for second cam to move and for latch to move to open position.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 may be scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 may be produced by aircraft manufacturing and service method 1600 in FIG. 16 and may include airframe 1702 with plurality of systems 1704 and interior 1706. Examples of systems 1704 may include one or more of propulsion system 1708, electrical system 1710, hydraulic system 1712, and environmental system 1714. Any number of other systems may be may included. Although an aerospace example may be shown, different illustrative embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies produced in component and subassembly manufacturing 1606 in FIG. 16 may be fabricated or manufactured in a manner similar to components or subassemblies produced while aircraft 1700 may be in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 may be in service 1612 and/or during maintenance and service 1614 in FIG. 16. The use of a number of the different illustrative embodiments may substantially expedite the assembly of and/or reduce the cost of aircraft 1700.

The flowcharts and block diagrams in the different depicted illustrative embodiments illustrate the architecture, functionality, and operation of some possible implementations of apparatuses and methods Illustrative embodiments provide for. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, blocks may be removed from and other blocks may be added in addition to the illustrated blocks in a flowchart or block diagram.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of folding a wing of an aircraft, the method comprising:
    moving, via a fold actuator, an unfixed portion of the wing with respect to a fixed portion of the wing between a flight position and a folded position;
    preventing, via a latch, movement of the unfixed portion of the wing with respect to the fixed portion of the wing, the latch comprising: a first lock configured to prevent movement of a latch pin of the latch, and a first cam configured to, via contact with a second cam comprising a second lock, prevent the second lock from transitioning to a second engaged position until the first lock is in a first engaged position;
    preventing, via the second cam, the first lock from transitioning away from the first engaged position until the second lock transitions away from the second engaged position
    transferring a first force, via a first shaft of the first lock, from a first piston to first cam and to the first lock member;
    transferring a second force, via a second shaft of the first lock, from the first spring to the first lock member;
    transferring a third force, via a third shaft of the second lock, from a second piston to the second cam and to the second lock member; and
    transferring a fourth force, via a fourth shaft of the second lock, from the second spring to the second lock member.

2. The method of claim 1, further comprising:
    biasing, via an actuator spring, an actuator lock to an engaged position when the fold actuator is in an extended position.

3. The method of claim 1, further comprising:
    securing, via a group of lugs comprising the latch, the unfixed portion of wing to the fixed portion of the wing, the group of lugs comprising:
        one or more wingtip lug, each wingtip lug attached to the unfixed portion of the wing and each comprising a first opening that coincides with a second opening of an inner lug when the wing is in a flight position; and
        one or more inner lug, each inner lug attached to the fixed portion of the wing and each comprising the second opening that coincides with the first opening of the wingtip lug.

4. The method of claim 1, further comprising:
    transitioning, via a latch actuator, the latch between an open position and a closed position; and
    sensing, via an unlatched sensor: when the latch is in the open position, and when the unlatched sensor is connected to a latch pin actuator.

5. The method of claim 1, further comprising:
    sliding the latch pin substantially parallel to a longitudinal axis of the aircraft when transitioning between an open position and a closed position;
    wherein the latch pin includes:
        an inner pin within an outer pin;
        the inner pin providing a secondary load path if outer pin is unable to provide a load path;
        the inner pin not providing the load path until the outer pin is unable to provide the load path;
        the outer pin comprising a group of stacked pins;
    separating, via the group of stacked pins, the load path for a group of lugs comprising one or more inner lug and one or more wingtip lug; and
    isolating, via the group of stacked pins, an inability of one stacked pin, from remaining stacked pins of the group of stacked pins, to provide the load path.

6. The method of claim 5, further comprising:
    engaging, via one of the first lock and the second lock, the outer pin; and
    engaging, via the other of the first lock and the second lock, the inner pin and the outer pin.

7. The method of claim 1, further comprising:
    engaging, via a first spring comprised by the first lock, the first lock;
    biasing, via the first spring, the first lock to the first engaged position;
    engaging, via a second spring comprised by the second lock, the second lock; and
    biasing, via the second spring, the second lock to the second engaged position.

8. The method of claim 1, further comprising:
    disengaging, via a first piston connected to the first cam, the first lock;
    transitioning, via the first piston, the first lock from the first engaged position to a first disengaged position;
    disengaging, via a second piston connected to the second cam, the second lock; and transitioning, via the second piston, the second lock from the second engaged position to a second disengaged position.

9. The method of claim 1, further comprising:
preventing, via a first contact member comprised by the first cam, the first lock from transitioning away from the first engaged position before the second lock transitions away from the second engaged position via contact between the first contact member of the first cam and a second contact member comprised by the second cam when the first lock is in the first engaged position and the second lock is in the second engaged position; and
preventing, via the second contact member, the second lock from transitioning to the second engaged position before the first lock transitions to the first engaged position via contact between the second contact member comprised by the second cam and the first contact member comprised by the first cam before the first lock is in first engaged position.

10. The method of claim 1, further comprising:
minimizing, via a first surface of a first lock member of the first lock of a group of locks and a third surface of a second lock member of the second lock of the group of locks, contact with the latch pin in a closed position;
minimizing, via a second surface of the first lock member of the first lock of the group of locks and a fourth surface of the second lock member of the second lock of the group of locks, contact with the latch pin while transitioning to an open position;
minimizing, via the first surface, movement of the first lock member during transition to the first engaged position; and
minimizing, via the third surface, movement of the second lock member during transition to the second engaged position.

11. The method of claim 10, further comprising:
reducing, via a roller of the first lock member juxtaposed between the first surface and the second surface, friction between the first lock member and the latch pin as the latch pin moves into a group of lugs.

12. The method of claim 10, further comprising:
sensing when the first lock is in the first engaged position, via a sensor that senses when the second lock is in the second engaged position.

13. The method of claim 10, further comprising:
controlling, via a group of first nubs of the first lock member, movement of the first lock member to stop the first lock member in the first engaged position;
creating, via the group of first nubs, a group of first witness marks on the latch pin to aid an inspection of the latch;
controlling, via a group of second nubs of the second lock member, movement of the second lock member to stop the second lock member in the second engaged position;
creating, via the group of second nubs, a group of second witness marks on the latch pin to aid the inspection of the latch; and
identifying, via a quantity of the first nubs differing from a quantity of the second nubs, that the group of first nubs create the group of first witness marks and the group of second nubs create the group of second witness marks.

14. A wing fold system of a wing of an aircraft, the system comprising:
a first lock of a latch configured to prevent movement of a latch pin of the latch and prevent movement of an unfixed portion of the wing with respect to a fixed portion of the wing, the first lock comprising a first cam configured to prevent a second lock from transitioning to a second engaged position until the first lock is in a first engaged position via contact with a second cam of the second lock;
the second lock of the latch, the second lock comprising the second cam configured to prevent the first lock from transitioning away from the first engaged position until the second lock transitions away from the second engaged position
the first cam comprising a first contact member configured to prevent the first lock from transitioning away from the first engaged position before the second lock transitions away from the second engaged position via contact between the first contact member of the first cam and a second contact member comprised by the second cam when the first lock is in the first engaged position and the second lock is in the second engaged position;
the second cam comprising the second contact member configured to prevent the second lock from transitioning to the second engaged position before the first lock transitions to the first engaged position via contact between the second contact member and the first contact member before the first lock is in second engaged position;
a first shaft of the first lock configured to connect a first lock member to the first cam and a first piston;
a second shaft of the first lock configured to connect the first spring with the first lock member;
a third shaft of the second lock configured to connect a second lock member to the second cam and a second piston; and
a fourth shaft of the second lock configured to connect the second spring with the second lock member.

15. The system of claim 14, further comprising:
a latch actuator configured to transition the latch between an open position and a closed position;
an unlatched sensor to sense when the latch is in the open position, the unlatched sensor connected to the latch actuator;
the latch pin configured to slide substantially parallel to one of: a roll axis, and a longitudinal axis of the aircraft;
the latch pin comprising an inner pin within an outer pin, the inner pin configured to provide a secondary load path when the outer pin is unable to provide a load path;
the outer pin comprising a group of stacked pins;
the group of stacked pins configured to separate the load path for a group of lugs comprising one or more inner lug and one or more wingtip lug; and
the group of stacked pins configured to isolate an inability of one stacked pin, from remaining stacked pins of the group of stacked pins, to carry the load path.

16. The system of claim 15, further comprising:
one of: the first lock, and the second lock, configured to engage the outer pin;
the other of the first lock and the second lock may engage the inner pin and the outer pin;
the first lock comprising:
a first piston configured to: disengage the first lock, and transition the first lock from the first engaged position to a first disengaged position,
and a first spring configured to bias the first lock to the first engaged position; and
the second lock comprising:
a second piston configured to: disengage the second lock, and transition the second lock from the second engaged position to a second disengaged position,
and a second spring configured to bias the second lock to the second engaged position.

17. An apparatus configured to increase a fuel efficiency of an aircraft, the apparatus comprising:
- a fold actuator configured to increase a wingspan of the aircraft in a flight position, the fold actuator having a single chamber;
- a latch pin configured to latch an unfixed portion of the wing of the aircraft in the flight position, the latch pin comprising:
  - an inner pin configured to provide a secondary load path; and
  - an outer pin comprising a group of stacked pins;
- a first lock of a latch configured to prevent movement of the latch pin of the latch and prevent movement of the unfixed portion of the wing with respect to a fixed portion of the wing, the first lock comprising a first cam configured to prevent a second lock from transitioning to a second engaged position until the first lock is in a first engaged position via contact with a second cam of the second lock;
- the second lock of the latch, the second lock comprising the second cam configured to prevent the first lock from transitioning away from the first engaged position until the second lock transitions away from the second engaged position;
- the first cam comprising a first contact member configured to prevent the first lock from transitioning away from the first engaged position before the second lock transitions away from the second engaged position via contact between the first contact member comprised by the first cam and a second contact member comprised by the second cam when the first lock is in the first engaged position and the second lock is in the second engaged position;
- the second cam comprising the second contact member configured to prevent the second lock from transitioning to the second engaged position before the first lock transitions to the first engaged position via contact between the second contact member and the first contact member before the first lock is in second engaged position;
- a first shaft of the first lock configured to connect a first lock member to the first cam and a first piston;
- a second shaft of the first lock configured to connect the first spring with the first lock member;
- a third shaft of the second lock configured to connect a second lock member to the second cam and a second piston; and
- a fourth shaft of the second lock configured to connect the second spring with the second lock member.

* * * * *